(12) United States Patent
Morsa

(10) Patent No.: US 7,904,337 B2
(45) Date of Patent: Mar. 8, 2011

(54) MATCH ENGINE MARKETING

(76) Inventor: Steve Morsa, Thousand Oaks, CA (US)

( * ) Notice: Subject to any disclaimer, the term of this patent is extended or adjusted under 35 U.S.C. 154(b) by 1415 days.

(21) Appl. No.: 11/250,908

(22) Filed: Oct. 13, 2005

(65) Prior Publication Data

US 2006/0085408 A1 Apr. 20, 2006
US 2010/0049695 A2 Feb. 25, 2010

Related U.S. Application Data

(60) Provisional application No. 60/619,987, filed on Oct. 19, 2004.

(51) Int. Cl.
*G06Q 30/00* (2006.01)
*G06Q 10/00* (2006.01)
(52) U.S. Cl. .................................. 705/14.71; 705/1.1
(58) Field of Classification Search .................. 705/1.1, 705/14.55, 14.56, 14.66, 14.67, 14.69, 14.7, 705/14.71, 14.4
See application file for complete search history.

(56) References Cited

U.S. PATENT DOCUMENTS

| | | | |
|---|---|---|---|
| 5,794,210 A | 8/1998 | Goldhaber et al. | |
| 6,269,361 B1 | 7/2001 | Davis et al. | |
| 6,385,592 B1 | 5/2002 | Angles et al. | |
| 6,460,036 B1 | 10/2002 | Herz | |
| 6,983,272 B2 | 1/2006 | Davis et al. | |
| 2001/0042132 A1 | 11/2001 | Mayadas | |
| 2002/0026351 A1 | 2/2002 | Coleman | |
| 2002/0046104 A1 | 4/2002 | Kaddeche et al. | |
| 2002/0099605 A1 | 7/2002 | Weitzman et al. | |
| 2002/0116313 A1 | 8/2002 | Detering | |
| 2003/0033199 A1 | 2/2003 | Coleman | |
| 2003/0093283 A1 | 5/2003 | Morsa | |
| 2003/0216930 A1* | 11/2003 | Dunham et al. | 705/1 |
| 2004/0186769 A1 | 9/2004 | Mangold et al. | |

* cited by examiner

*Primary Examiner* — Jonathan Ouellette

(57) ABSTRACT

Enabling advertisers using a computer network such as the Internet and a match engine to submit their offerings to product, service, benefit seeking entities. In some embodiments, a database having accounts for the providers is made available. Accounts contain contact and billing information for an advertiser; and at least one offering having at least a description, a criteria set comprising one or more criterion factors, and a bid amount. An advertiser influences a position of an offering in the advertiser's account by first selecting offering relevant criteria. The advertiser enters the criteria and the description into a listing; influencing at least in part the position for the listing within a results page through an online bidding process. This results page is generated in response to a seeking entity query of the match engine. Pay for performance demographic, geographic, psychographic criteria/characteristics targeted directly advertising (frictionless advertising) is enabled.

229 Claims, 10 Drawing Sheets

Here's Your Official Match Me Questionnaire!

Welcome! Complete this short, confidential questionnaire for a Free List of up to 100's of Commercial and Government Products, Services, and Benefits specially designed and available just for you and folks like you. Many you've probably never even heard of and can only find out about here. *Prepare to be nicely surprised!*

Date of Birth: _ _ _ _ _ _  Marital Status: Single __ Married __ Divorced __ Separated __  Sex: M __ F __

Do You: Own Home ___ Rent/Lease ___ In what city/town do you live: _____ State: ___ (2-letter)

Zip Code: _ _ _ _ _  Children Living at Home (Y/N): __ If yes, please list ages of each: __, __, __, __, __, __

Your annual income is: __ Under $20,000 __ $20,001-$29,999 __ $30,000-$49,999 __ $50,000-$74,999
___ $75,000-$99,999 ___ $100,000-$149,999 ___ $150,000-$199,999 ___ $200,000 & over How many people, including yourself, are in your household? _____ How many years at current address? ___

Are you (check all that apply): __ Homemaker? __ Retired? __ Student? __ Self Employed/Business Owner?
__ Working from a home office? __ In the Military? __ A Federal, State, County, or City/Town employee?

Occupation (check all that apply): __ Professional/Technical __ Tradesman/Machine Operator/Laborer
__ Upper Management/Executive __ Middle Management __ Sales/Marketing __ Clerical/Service Worker Education level (Y/N): ___ Completed College ___ Completed High School ___ Completed Grad School Do you own stocks, bonds, mutual funds, or investment real estate? __ (Y/N) If no, would you like to? ___

What are the two newest cars in your household? Car #1: Make _____ Model _____
Year _____ Car #2: Make _____ Model _____ Year _____
Are they (Y/N): Car #1: Leased ___ Financed ___ Car #2: Leased ___ Financed ___

Credit cards used regularly (Y/N): __ AM/EX/Diners __ Master Card/Visa/Discover __ Dept Store/Gas/etc Which of the following do you plan to do within the next 6 months (check all that apply): ___ Get Married?
___ Have a baby? ___ Buy a house/condo/co-op? ___ Remodel a home? ___ Buy/Lease a new vehicle?
___ Buy/Lease a used vehicle? ___ Buy a personal computer? __ Move to a new city, town, state, country?
___ Take a cruise? ___ Travel to another country? ___ Buy a timeshare? ___ Buy a vacation home?

Any medical conditions/problems you or someone in your household have? (check all that apply): ___ Asthma
___ Snoring ___ Allergies ___ Arthritis ___ Heart/Circulation ___ High Blood Pressure ___ Headaches
List any other 3 not listed above: _____, _____, _____

Which of these activities do you/your spouse (if married) enjoy doing on a regular basis? (check all that apply):
__ Golf __ Physical Fitness/Exercise __ Running/Jogging __ Snow Skiing __ Water Skiing __ Sailing
__ Camping/RVing __ Gardening __ Fishing __ Cooking __ Listen to Music __ Reading __ Vacationing
__ Sewing/Crafts __ Hunting/Shooting __ Antiques/Fine Art __ TV/Radio __ Photography __ Other(s)
Do you have pets? Please list number and types: _____
Your political affiliation?(check one): __ Republican __ Democrat __ Independent __ Other __ Decline to state

*Before you submit your request, remember that the more complete and accurate you are when filling out the questionnaire, the more products, services, and benefits you may qualify for! When you're all done, just click Match Me!* Match Me!

FIG. 10

MATCH ENGINE MARKETING

CROSS-REFERENCE TO RELATED APPLICATIONS

This application claims priority benefit from U.S. Provisional Application No. 60/619,987, entitled MATCH ENGINE MARKETING: SYSTEM AND METHOD FOR INFLUENCING POSITIONS ON PRODUCT/SERVICE/BENEFIT RESULT LISTS GENERATED BY A COMPUTER NETWORK MATCH ENGINE, filed on Oct. 19, 2004; naming Steve Morsa as inventor. The entirety of such provisional patent application is incorporated by reference herein.

STATEMENT REGARDING FEDERALLY SPONSERED RESEARCH OR DEVELOPMENT

Not Applicable

SEQUENCE LISTING OR PROGRAM

Not Applicable

REFERENCE TO A MICROFICHE APPENDIX

Not Applicable

TRADEMARK REFERENCE

MATCH ENGINE MARKETING and PAID MATCH are trademarks of the inventor. All rights reserved.

COPYRIGHT NOTICE

A portion of the disclosure of this patent document contains material which is subject to copyright protection. The copyright owner has no objection to the facsimile reproduction by anyone of the patent document or patent disclosure as it appears in the Patent and Trademark Office patent file or records, but otherwise reserves all copyright rights whatsoever.

ABSTRACT NOTICE

As it is an abstract only and therefore in no way exhaustive of the present inventions numerous possible forms and embodiments, it is to be understood that the present inventions Abstract is not intended to, and should accordingly not be used to, either limit the scope of the claims or to limit the invention to any particular embodiment(s) or to (a) precise form(s).

TECHNICAL FIELD

This invention relates generally to the field of advertising, and in particular to the field of matching advertisers with entities via computer networks.

BACKGROUND OF THE INVENTION

The transfer of information over computer networks has become an increasingly important means by which institutions, corporations, and individuals do business. Computer networks have grown over the years from independent and isolated entities established to serve the needs of a single group into vast internets which interconnect disparate physical networks and allow them to function as a coordinated system. Currently, the largest computer network in existence is the Internet. The Internet is a worldwide interconnection of computer networks that communicate using a common protocol. Millions of computers, from low end personal computers to high end super computers, are connected to the Internet.

The Internet has emerged as a large community of electronically connected users located around the world who readily and regularly exchange significant amounts of information. The Internet continues to serve its original purposes of providing for access to and exchange of information among government agencies, laboratories, and universities for research and education. In addition, the Internet has evolved to serve a variety of interests and forums that extend beyond its original goals. In particular, the Internet is rapidly transforming into a global electronic marketplace of goods and services as well as of ideas and information.

Current paradigms for generating web site traffic, such as banner advertising, follow traditional advertising paradigms and fail to utilize the unique attributes of the Internet. In the banner advertising model, web site promoters seeking to promote and increase their web exposure often purchase space on the pages of popular commercial web sites. The web site promoters usually fill this space with a colorful graphic, known as a banner, advertising their own web site. The banner may act a hyperlink a visitor may click on to access the site. Like traditional advertising, banner advertising on the Internet is typically priced on an impression basis with advertisers paying for exposures to potential consumers. Banners may be displayed at every page access, or, on search engines, may be targeted to search terms. Nonetheless, impression-based advertising inefficiently exploits the Internet's direct marketing potential, as the click-through rate, the rate of consumer visits a banner generates to the destination site, may be quite low. Web site promoters are therefore paying for exposure to many consumers who are not interested in the product or service being promoted, as most visitors to a web site seek specific information and may not be interested in the information announced in the banner. Likewise, the banner often fails to reach interested individuals, since the banner is not generally searchable by search engines and the interested persons may not know where on the web to view the banner.

Pay for placement database search systems have been developed in which advertisers bid on the placement of their listings in search results returned to a searcher in response to a world wide web query from a searcher. Each advertiser's listing includes a search term and a bid amount. In some embodiments, each advertiser's listing includes a title, descriptive text and a clickable hyperlink or uniform resource locator (URL). The database of search listings stores many such listings, each associated with an advertiser. Upon receipt of the query, the database is searched and listings having a search term matching the query are formatted for display to the searcher as search results.

The advertisers adjust their bids or bid amounts to control the position at which their search listings are presented in the search results. The pay for placement system places search listings having higher-valued bids higher or closer to the top of the search listings. Other rules may be applied as well when positioning search listings.

For example, a more senior listing may be positioned or ranked higher than a junior listing for the same search term and same bid. Higher-ranked listings are seen by more searchers and are more likely to be clicked, producing traffic of potential customers to an advertiser's web site.

The searcher is presented with search listings based at least in part on the hid amounts. The search listings may extend over several screens or pages when formatted for viewing. As a result, higher positioned search listings are much more likely to be seen by the searcher. Moreover, some pay for placement systems have affiliate agreements whereby some of their highest-bidded search listings are presented to searchers using other general purpose search engines. Because of these affiliate agreements and similar arrangements, an advertiser's web site, if bid highly enough, may today be seen by as many as seventy-five percent of Internet users.

An advertiser wishing to attract searchers to his web site as potential customers for the advertiser's goods and services thus has an incentive to position his search listing relatively high in the search results. An advertiser may enter bids on many search terms. For search terms which are closely related to the content of the advertiser's web site, the advertiser might place relatively large bids. For less closely related search terms, the advertiser might place smaller bids. A number of strategies have been developed by advertisers to increase traffic to advertiser web sites in this manner.

Similarly, pay for placement search systems have developed tools to help the advertisers manage their bids and attract traffic. Overture Services, Inc., (now a division of Yahoo) operating a system at www.overture.com; and Google, at www.google.com, have presented advertisers with a standard bidding page accessible over the world wide web. The standard bidding page allows an advertiser to log in, display and edit all current search listings and review bids. Today, a number of other competitors including FindWhat also offer such pay for placement systems.

Despite their current popularity, however, such conventional pay for placement systems actually have a surprising number of major drawbacks. First, as a result of these systems quickly expanding recognition and use since their development in the late 1990's, combined with their having an effective limit on the number of economically viable search terms upon which advertisers are willing to bid on, such systems growth rate is now predicted to decline precipitously in the years to come. Due to the popularity of and resultant often rabid bidding for the most effective and responsive search terms, many companies—especially smaller ones—are starting to drop out of such systems due to this growing lack of affordability. In fact, some experts now believe that in the years to come, as has been the case with broadcast television, only larger companies, often bidding on 100's or even 1,000's of search terms each, will be able to even afford to participate in such systems at all.

Second, as is well known in this "search engine marketing" [SEM] industry, despite these systems best efforts, attempting to match advertisements to search terms is inherently problematic when working within an unstructured environment like the Internet. Because search engines use at least in part impersonal algorithms, link analysis, and other automated methodologies to locate and present search—and advertising—results, the delivery of irrelevant or minimal-relevancy advertisements to the searcher is all too common. Indeed, attempting to discern searchers intent from the search terms they use is often characterized as being akin to trying to read their minds.

A third problem with these systems is their inability to identify those many products, services, and benefits the searchers know nothing about yet for which they may—and do—qualify to obtain, use, and benefit from. While knowing ones intent is great (if and when you can discern it), basing (so called) targeted advertising presentations on just that factor shortchanges both entities and the provider/advertisers. With such "targeted by intent only" advertising systems, it's very much a case of "if only you knew how much you don't know."

A fourth problem is the artificial limit such systems, by their structural nature, place on the number of advertisers who can effectively obtain placement—and therefore visibility of their advertising—based on each search term. People conduct searches because they are looking for information of some type from any web site or source which might have it; and, they are not normally very patient about getting it. Numerous studies have shown that few people will view more that the first two or three pages of search results before either changing the search terms and trying again; or trying their search at one or more of the many other readily available search engines. This means that—because computer screens and therefore web pages are of limited physical/viewable size, there's only a precious few positions of any marketing value for advertisers to bid on if they expect their ads to even be seen by the searcher (or by worthwhile numbers of searchers), much less clicked on and forwarded to the advertisers web site for a potential purchase to take place.

Relatedly, because people conducting searches usually are doing so to quickly gather what they consider to be unbiased (and preferably advertising-free) information, and not to look at a bunch ads; if they don't find the information they're actually looking for in the first few pages, as stated, they don't often stick around scrolling through pages and pages of ads stuck along the side of or amongst what to them is irrelevant content. If they don't quickly see what they're looking for in the first few pages, anything that follows is history—including any remaining ads.

A little talked about fifth problem with search engine marketing systems is "click fraud;" where clicks on the various displayed paid listings are executed either manually or via automated systems (some now very sophisticated in their operation) not due to an interest in the product or service advertised, but in order to inflict financial pain on targeted advertisers (often by their competitors, who are unfortunately able to easily identify the search terms their competition is paying for) and/or in order to gain illegal commissions for the entities (or their agents) perpetrating these frauds. Overseas "click fraud rings" have even recently sprung up to take advantage of this vulnerability. Some estimates place such fraud as high as 10-20% or more of all "hits" on the most valuable search terms and/or within the most competitive industry sectors. Such fraud; considered by many in the field to be far more widespread than is readily admitted to by the providers of such systems; may reportedly be costing many advertisers up to $100's to 10's of $1,000's of dollars a month or more.

A sixth problem with such systems is their great difficulty in delivering search results—and therefore advertisers—who are geographically local to individual searchers. While at this time SEM has become a five-billion dollar/year industry, various estimates place the total potential SEM market to be perhaps three-to-five times this amount; if only locally-based vendors were able to target their products and services only to those people within reasonable driving distance of their places of business. It doesn't do "Joe's Plumbing" any good to be one of the paying advertisers on a search term such as "plumbing," when only a minuscule percentage of "plumbing" searchers are within Joe's geographic service area, and therefore able to take advantage of his services.

A seventh problem with SEM systems is their inherently complicated, esoteric nature. While sophisticated product and service providers have—though usually with the assistance of experts in the field—readily embraced these systems, precious few of the many millions of smaller companies and professional practices have done so. Already familiar—and comfortable—with such media as yellow pages, newspapers, direct mail; perhaps even radio and TV; they've understandably shown little interest to date in putting complicated SEM (or the related search engine optimization [SEO]) techniques and methodologies to work in their businesses—even as much additional profit doing so could mean to them. The whole complicated Internet advertising business leaves them lost and confused. As the current conventional SEM advertising systems continue to become more and more complicated as the years go on, this small-company/business disconnect only continues to grow worse.

These paid search systems eighth problem is centered around trademark infringement and related intellectual property (IP) issues. An important percentage of the words and phrases targeted by advertisers utilizing SEM systems are actually the legal product, service, and business-name trademarks of many 100's to 1,000's of companies around the world who are for the most part understandingly very displeased and "up in arms" over the use of their intellectual property by competitors and others profiting from their well-known creations. Though recent indications are that this issue may be reaching a conclusion and resolution generally favorable to those providing and utilizing such SEM systems within the US; as recently illustrated by the French court decision against one of the world's largest paid search providers, such favorable outcomes may be few and far between when it comes to other countries; most of which regularly demonstrate a greater propensity for "protecting" their established companies against real or perceived interlopers and "outsiders" than does the US.

Thus, search engine marketing (SEM) and other traditional paradigms of advertising fail both to provide maximized results to 10's of millions of businesses/advertisers, while further failing to deliver the up to 100's of little- or un-known yet valuable and useful, relevant, targeted product, service, and benefit opportunities and information to interested parties in a cost-effective manner. Internet advertising done right can offer a level of targetability, interactivity, measurability, and competitive privacy not generally available from other media. With the proper tools, technologies, and methodologies; Internet advertisers have the ability to quickly, easily, affordably, and confidentially target their messages to specific groups of consumers and receive prompt feedback as to the effectiveness of their advertising campaigns.

Ideally, web site promoters should be able to control their placement in match result listings so that their listings are prominent in match requests that are relevant to the content of their web site and/or their offerings. The match engine functionality of the Internet (i.e. GovBenefits.gov and BenefitsCheckUp.org) needs to be focused in a new direction to facilitate an on-line marketplace which offers consumers and other entities quick, easy and relevant match results while providing Internet advertisers and promoters of all sizes and revenues with a cost-effective way to target consumers. A consumer utilizing a match engine that facilitates this on-line marketplace will find companies, businesses, government and non-profit agencies, etc that offer the products, services, benefits and information that the consumer is seeking. In this on-line marketplace, companies selling or offering products, services, benefits, or information bid in an open auction environment for positions on a match result list generated by an Internet match engine.

Since advertisers must pay for each click-through referral generated through the match result lists generated by the match engine, advertisers have in incentive to select and bid on those match criteria (characteristics) which are most relevant to their web site and offerings. The higher an advertiser's position on a match result list, the higher likelihood of a "referral;" that is, the higher the likelihood that a consumer will be referred to the advertiser's web site/offerings through the match result list.

Therefore; it would be desirable then to provide a system and method which would readily reduce/mitigate/overcome the many substantial drawbacks, deficiencies, and shortcomings of the present conventional advertising paradigms.

ADVANTAGES

Accordingly, the present invention may in one or more of its various embodiments have one or more of the following advantages:

The providing of a more level playing field where individuals, companies, businesses, and professional practices of all types, sizes, industries, and revenues may more quickly, easily, and affordably compete more among and between themselves for customers and clients.

The providing of a system and method where promoters may have their choice of potentially up to millions of different targeted criteria combinations from which to target their offerings to.

The providing of a system and method where up to 100's or more of advertisers at one time may be more effectively and profitably displayed to, viewed by, and have their web sites visited (and/or be otherwise contacted) by these motivated, highly-interested product, service, benefit, and information seekers.

The creation of a new system of advertising where advertisers target the most interested-consumers and entities by participating in a free market which attaches a monetary cost for an advertiser's listing in a match result list generated using advertiser-selected criteria.

The providing to product, service, benefit, and information seeking entities with products, services, benefits, and information individually tailored and specifically targeted to their demographic, geographic, psychographic factors (collectively; multigraphics).

The providing of a system and method where benefit providers may more quickly, easily, and affordably identify potential recipients for whom to present their must-qualify-for-in-order-to-receive benefits and benefit programs.

The providing of a system and method for enabling promoters to influence a position on a match result list generated by a match engine for a specified set of criteria.

The providing of a system and method for enabling promoters to specify criteria to the match engine so as to target their match result list placement to the match queries most relevant to their business/offer.

The providing of a system and method for enabling promoters to examine their current criteria and placement couplings online and to make substantially instantaneous changes to their selected criteria, placements, and web site titles and descriptions.

The providing to promoters a match engine that permits such promoters to influence a higher or lower placement in a match result list via a continuous, competitive online bidding process.

The providing of a cost-effective method of Internet advertising where the web site promoter is charged in direct proportion to the number of actual visits generated by the match engine.

The allowing of a web site promoter to control a title or description associated with the promoters listing in a match result list generated by the match engine.

The providing of a pay-per-click (PPC) system with reduced click fraud and concurrent increased advertiser competitive privacy by making more difficult both the identification of any particular advertiser(s) as well as their advertisement(s).

The reduction and/or possible elimination of the real or perceived need and/or desire of many PPC advertisers to bid on other companies trademarked products and services in order to reach their desired prospects.

The enabling of the identification of products, services, and benefits which are available to an entity yet which entity would otherwise have little or no knowledge of.

The enabling of less sophisticated product and service providers to also make use of Internet based pay-for-performance advertising due to the present invention being a more quickly and easily understood and utilized PPC system.

The enabling of local companies/businesses to more easily pay-for-performance PPC advertise to only those prospects located and/or operating within the geographic areas in which these companies/businesses choose to provide their products and services.

The frictionless advertising disintermediation of traditional advertising vehicles including one or more of the following Newspapers, Magazines, Search engines, Television, Radio, Phone directories, Direct mail, Web sites, Billboards, Insert media (i.e., package inserts; ride alongs, blow-ins); etc.

SUMMARY OF THE INVENTION

The present invention provides a way for product/service/benefit (and information) providers/advertisers/promoters (hereinafter "advertisers, "providers," or "promoters") using a computer network to influence the positions within a product/service/benefit (hereinafter "PSB") result list (hereinafter "PSB result list" or just "result list") generated by a product/service/benefit (PSB) matching "engine" (hereinafter "match[ing] engine" or just "engine").

More particularly, the present invention relates to a system and method to enable providers/advertisers to select PSB criteria/characteristics (hereinafter "PSB criteria" or "criteria" or "characteristics") relevant (having nexus) to themselves and/or their product(s)/service(s)/benefit(s) (hereinafter "PSBs" or "offerings"); and influence result list positions for their PSB listings (hereinafter "PSB listings" or just "listings") on a match engine result list.

"Entities" shall herein be understood to mean individuals, companies, businesses, non-profits, charities, governments, educational institutions, and families; including any and all other agencies, groups, organizations, enterprises, etc, (of any manner or form); and also including two or more of any of these entities acting together and in concert with one another.

In a preferred embodiment, after a PSB seeker (hereinafter "PSB seeker," "entity seeker," or simply "seeker") has completed the requisite seeker questionnaire/survey/profile (hereinafter "questionnaire"), the match engine will generate a results list with each respective providers' listing(s) in position(s) influenced at least in part by at least one criterion (criteria) factor as chosen by each providers. It is to be understood that "criteria," as used herein, includes both the singular (criterion) as well as the plural (criteria); as is common in today's language.

In a preferred embodiment of the present invention, a provider selects one or more of its criteria and influences a position within the results list generated by that criteria by participating in an online competitive bidding process. This online competitive bidding process is known as a "pay only for results" process, "Pay only for results" applies market principles to PSB matching on the Internet, Conventional PSB matching engines do not provide a way for providers to easily predict the position of their PSBs in results lists.

A tool enabling providers to target criteria relevant to their business/purpose and to pinpoint the placement of their PSBs within the results provides a powerful advantage to businesses and others seeking to increase the use of their PSBs. Furthermore, a competitive bidding process and pricing based on number of referrals generated helps insure that the pricing structure reflects the market and is accessible to providers of all budget sizes.

To participate in the process, a PSB provider may in a preferred embodiment access the provider's user account through a secure web site. The provider may use the account to place bids on criteria that are relevant to the provider's web site (e.g., it products, services, benefits, information). Each bid is specific to at least one criterion and corresponds to a money amount that the provider will pay to the owner of the matching engine each time a seeker clicks on the provider's hyperlinked listing in the result list generated by the matching engine. The seeker's click will result in an access request being sent to the provider's web site (or, in other embodiments, (an) alternative location(s) of provider's choosing, including one or more product/informational/sales message pages in the event provider doesn't have (a) web site/s or prefers not to use it/them), which will respond by transmitting the provider's web page to the seeker's browser. The charge to the provider for the placement is therefore directly proportional to the benefit received, since the charge is based on the number of referrals to the provider's web site (as stated, and/or other online or offline provider designated location/s) that were generated by the matching engine.

Preferably, the higher the bid, the more advantageous the placement in the result list that is generated when the bidded criteria is entered by a PSB seeker using the engine. The list is arranged in order of decreasing hid amount, with the PSB listing corresponding to the highest bids displayed first to the seeker. Optionally, each PSB listing corresponding to a bid is identified on the display as a paid listing. If so, the bid amount may be included on the identification. In addition, the result list of the present invention is preferably combined with "non-paid" PSB descriptions; e.g. as with the numerous social benefits and other benefit programs provided by various government agencies, educational institutions, non-profit organizations, and the like. The combination of paid and unpaid listings helps ensure that the seeker will receive the most complete and relevant PSB results. Optionally, because the non-paid listings are considered to have a bid amount of zero, such listings may be located following/underneath the paid results.

According to a first embodiment of the present invention, there is provided a system and method for enabling PSB providers to influence a position for a PSB listing within a result list generated by a PSB matching engine. The provider first selects one or more criteria relevant to the PSB(s) to be listed. The provider influences the rank position for each listing through an ongoing online competitive bidding process with other providers. The bidding process occurs when a provider enters a new bid amount for an existing listing or enters a bid amount for a new listing. Preferably, the provider's bid is then processed in real or near real time. This bid amount is compared with all other bid amounts from other providers for the same criteria, with new rank values being generated for all listings having that criteria.

The rank value determines the position where the provider's web site description (and/or other contact and/or other information) will appear on the results page(s) that is generated once the questionnaire has been submitted to the matching engine by a PSB seeker. A higher bid will result in a higher rank value and a more advantageous placement, which is preferably near the beginning of the results list page. Though it could be virtually anything of value; preferably, the quantity used in the competitive bidding process is a money amount that the provider will pay to an owner of the matching engine each time the provider's web site is referred by the engine. Preferably, this money amount will be deducted from an account balance that is retained in the provider's account for each time the provider's web site is referred by the engine.

One embodiment of the system and method of the present invention provides a database having accounts for the PSB providers. Each account includes contact and billing information for a provider. In addition, each account includes at least one listing, each listing having preferably (though it could be more or less) five components: a description of the web site (and/or other contact/benefit information) to be listed, the Uniform Resource Locator (URL) of the web site, one or more criterion, a bid amount, and a title for the listing. Each account may also include the provider's payment history and a history of listings entered by the user. The provider logs in to its account via an authentication process running on a preferably secure server. Once logged in, the provider may add, delete, or modify a listing. The functions of adding or deleting a listing, or modifying the bid amount of a listing is to initiate the competitive bidding process described above. All listing changes and modifications are preferably processed substantially in real time to support the online competitive bidding process. Alternatively, the system operator or an entity acting on its behalf may itself set up and manage (automatically and/or manually) an advertising program for a system client e.g., as may be desired by provider/advertisers without a web presence.

In another embodiment, seekers clicks on the providers' listings may resolve not (just) to a web site, but could initiate any number of other commonly known to the arts contact/information delivery channels e.g., e-mails or instant messages could be sent, letters mailed, pop-ups delivered, commercials initiated, phone calls made, personal visits undertaken, etc. Any such "resolution(s)" deemed suitable (e.g., by the system administrator and/or by one or more advertisers) for the system of the present invention may be utilized. Note, however, that the architecture for and procedures to implement resolvations is not conventional in the system of the present invention as detailed herein.

The present invention is unique in that never before has there been an entity demographic, geographic, psychographic criteria targeted pay-for-performance system which allows product, service, and benefit provider/advertiser/promoters to pay for the exposure of their offerings to their desired targeted entities/marketplace(s) in real or substantially real time via a computer network. Further aspects of the present invention and many additional obvious advantages will become apparent during the course of the following description and by reference to the attached drawings.

As used herein including the claims, the term "benefit(s)" shall be understood to mean any product(s) [including money and monetary equivalents, e.g., vouchers, certificates, coupons, etc] or service(s) with a discounted (including to as little as zero cost) rate or other added value available to a PSB-seeking entity in addition to those product(s) or service(s) otherwise offered to the general set/applicable (of) entity(ies) for which such discounted products or services are designed for and targeted to.

Benefits are therefore themselves products and services; the difference being that "benefits," as used herein, are products and services (including programs) made unique and special due to their discounted and/or value-added nature; targeted as they are to some subset of/within one or more entity type. Benefits, unlike usual "available for purchase and/or use by all" products and services, have at least one eligibility/qualification requirement which absolutely must be met in order for an entity to obtain/use it/them.

Such requirements (criteria/characteristics) may include such factors as where a person lives, how much they earn, size and make-up of family, current/past employment, spending habits, personal property owned (cars, computers, etc), personal interests and desires, etc; number of employees in a business, a company's location, gross revenues, net profit, equipment needs (firmograpics); population of a town, industries present, geographic size, its demographic makeup; student number of an educational facility, its location, courses of study offered, expansion desires; number of people served by a non-profit organization, its targeted constituency, percentage of funds used for operations, etc.

A match engine is, typically, a program (or coordinated set of programs) with related structure (database, interface, etc) able to match entities (individuals, businesses, governments, non-profit organizations, etc) with products, services, and benefits based on the geographic and/or demographic and/or psychographic and/or firmographic criteria/characteristics unique to each entity.

Such a match engine is described in detail in Ser. No. 09/832,440 by the same present inventor, entitled Method and Apparatus for the Furnishing of Benefits Information and Benefits. It is incorporated herein by reference in its entirety.

Other examples of match engines include those provided and administered by the U.S. Dept. of Labor (DOL) and the National Council on the Aging (NCOA); as found at their respective GovBenefits.gov and BenefitsCheckUp.org websites.

While there are a number of useful similarities, principle, foundational difference between match engines and (Internet) search engines are that match engines' database(s) consist of an orderly collection of set-format, easily-identified; easily-correlated; easily-manipulated product, service, benefit information from any number of "member" companies and firms. Search engines, on the other hand, utilize algorithms, links, etc to "crawl" the unorganized, unstructured Internet in order to create a huge collection of disparate web (and other) pages of information from sources normally having no nexus of any type with the search engine itself; often in any number of disparate formats; usually gathered from some 100's of millions—or billions—of unrelated sources. Obtaining product, service, and benefit relevancy for system users with a match engine is therefore, unlike with search engines, a goal far more easily obtained.

Criteria (characteristics) are, essentially, the who, what, when, where, why, and how information/data/factors that are a part of/which correspond to all entities of all types; being most commonly of a demographic, geographic, psychographic (collectively; multigraphics), firmographic (generally, for non-human entities, i.e. companies, businesses, commercial enterprises, non-profits and charities, agencies, etc), interest/preference/desire nature.

"Seeker(s)" shall be understood to mean those entities desiring to obtain products, services, and benefits (and/or information concerning such) from the providers of such; and shall include individuals, businesses, and other commercial enterprises, non-profits and charities, governments, educational institutions, agencies, families, groups, organizations, enterprises, and any other entities of any type; including two or more of any of these entities acting together and in concert with one another. It is also to be understood that "(in) substantially (in) real time" also includes "in real time."

While in a preferred embodiment the current invention directs itself to combining products AND services AND benefits AND information together for maximum effectiveness, usefulness, and value; in alternative embodiments, it could easily also match entities to ONLY products, ONLY services, ONLY benefits, ONLY information; or to some combination of at least two of these four.

As it is a summary only and therefore in no way exhaustive of the present inventions numerous possible forms and embodiments, it is to be understood that the present inventions Summary is not intended to, and should accordingly not be used to, either limit the scope of the claims or to limit the invention to any particular embodiment(s) or to (a) precise form(s).

BRIEF DESCRIPTION OF SEVERAL VIEWS OF THE DRAWINGS

FIG. 10 illustrates an example of a seeker questionnaire used in one embodiment of the present invention.

DETAILED DESCRIPTION OF THE INVENTION

Methods and systems for generating a pay-for-performance product/service/benefit result determined by a site promoter, such as an advertiser, over a client/server based computer network system are disclosed. The following description is presented to enable any person skilled in the art to make and use the invention. For purposes of explanation, specific nomenclature is set forth to provide a thorough understanding of the present invention. Descriptions of specific applications are provided only as examples. Various modifications to the preferred embodiments will be readily apparent to those skilled in the art, and the general principles defined herein may be applied to other embodiments and applications without departing from the spirit and scope of the invention and its claims.

By way of example and not limitation, those skilled in the art will appreciate that the invention may be practiced with various computer system configurations, including hand-held devices, multiprocessor systems, microprocessor-based or programmable consumer electronics, network PCs, mini-computers, mainframe computers, other types of suitable computing devices, TV set-top boxes, cell phones, and the like.

Thus, the present invention is not intended to be limited to the embodiments shown, but is to be accorded the widest scope consistent with the principles and features disclosed herein.

Figure 1:
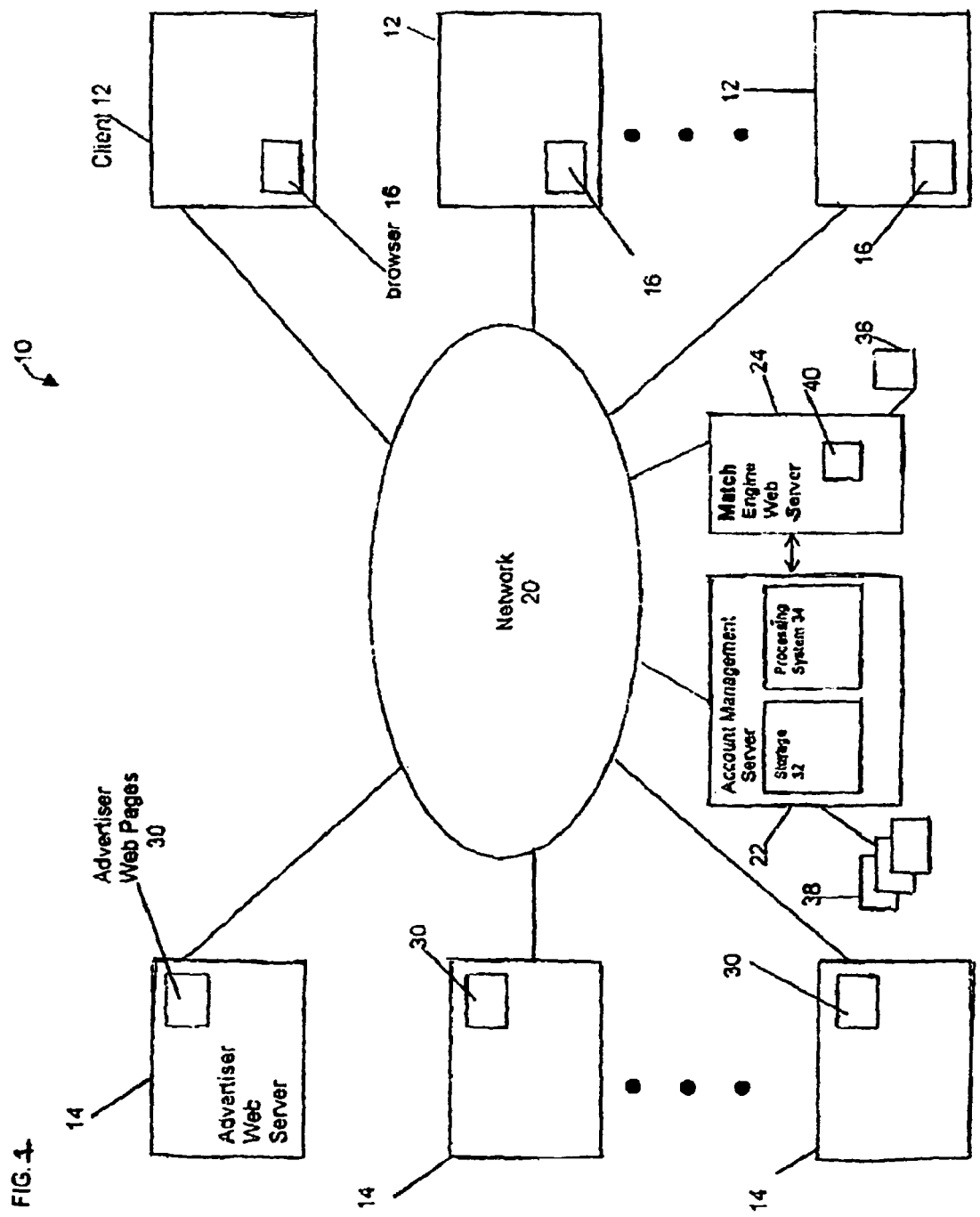
FIG. 1 is a block diagram illustrating the relationship between a large network and one embodiment of the system and method for generating a pay-for-performance Product/Service/Benefit (PSB) match result of the present invention.

Referring now to the drawings, FIG. 1 is an example of a distributed system 10 configured as client/server architecture used in a preferred embodiment of the present invention. A "client" is a member of a class or group that uses the services of another class or group to which it is not related. In the context of a computer network, such as the Internet, a client is a process (i.e. roughly a program or task) that requests a service which is provided by another process, known as a server program. The client process uses the requested service without having to know any working details about the other server program or the server itself. In networked systems, a client process usually runs on a computer that accesses shared network resources provided by another computer running a corresponding server process. However, it should also be noted that it is possible for the client process and the server process to nm on the same computer.

A "server" is typically a remote computer system that is accessible over a communications medium such as the Internet. The client process may be active in a second computer system, and communicate with the server process over a communications medium that allows multiple clients to take advantage of the information-gathering capabilities of the server. Thus, the server essentially acts as an information provider for a computer network.

The block diagram of FIG. 1 therefore shows a distributed system 10 comprising a plurality of client computers 12, a plurality of advertiser web servers 14, an account management server 22, and a match engine web server 24, all of which are connected to a network 20. The network 20 will be hereinafter generally referred to as the Internet. Although the system and method of the present invention is specifically useful for the Internet, it should be understood that the client computers 12, advertiser web servers 14, account management server 22, and match engine web server 24 may be connected together through one of a number of different types of wired and/or wireless networks. Such networks may include local area networks (LANs), other wide area networks (WANs), and regional networks accessed over telephone lines, cable, wireless; such as commercial information services. The client and server processes may even comprise different programs executing simultaneously on a single computer.

The client computers 12 can be conventional personal computers (PCs), workstations, computer systems, etc. Each client 12 typically includes one or more processors, memories, input/output devices, and a network interface, such as a conventional modem. The advertiser web servers 14, account management server 22, and the match engine web server 24 can be similarly configured. However, advertiser web servers 14, account management server 22, and match engine web server 24 may each include many computers connected by a separate private network. In fact, the network 20 may include hundreds of thousands of individual networks of computers.

The client computers 12 can execute web browser programs 16, such as the NAVIGATOR, EXPLORER, or FIREFOX browser programs, to locate the web pages or records 30 stored on advertiser server 14. The browser programs 16 allow the users to enter addresses of specific web pages 30 to be retrieved. These addresses are referred to as Uniform Resource Locators, or URLs. In addition, once a page has been retrieved, the browser programs 16 can provide access to other pages or records when the user "clicks" on hyperlinks to other web pages. Such hyperlinks are located within the web pages 30 and provide an automated way for the user to enter the URL of another page and to retrieve that page. The pages can be data records including as content plain textual information, or more complex digitally encoded multimedia content, such as software programs, graphics, audio signals, videos, and so forth.

In a preferred embodiment of the present invention, shown in FIG. 1, client computers 12 communicate through the network 20 with various product, service, and benefit providers, including account management server 22, match engine server 24, and advertiser servers 14 using the functionality provided by a Hypertext Transfer Protocol (HTTP), although other communications protocols, such as FTP, SNMP, TELNET, and a number of other protocols known in the art, may be used. Preferably, match engine server 24, account management server 22, and advertiser servers 14 are located on the World Wide Web.

As discussed above, at least two types of server are contemplated in a preferred embodiment of the present invention. The first server contemplated is an account management server 22 comprising a computer storage medium 32 and a processing system 34. A database 38 is stored on the storage medium 32 of the account management server 22. The database 38 contains advertiser account information. It will be appreciated from the description below that the system and method of the present invention may be implemented in software that is stored as executable instructions on a computer storage medium, such as memories or mass storage devices, on the account management server 22. Conventional browser programs 16, running on client computers 12, may be used to access advertiser account information stored on account management server 22. Preferably, access to the account management server 22 is accomplished through a firewall, not shown, which protects the account management and match result placement programs and the account information from external tampering. Additional security may be provided via enhancements to the standard communications protocols such as Secure HTTP or the Secure Sockets Layer.

The second server type contemplated is a match engine web server 24. A match engine program permits network users, upon navigating to the match engine web server URL or sites on other web servers capable of submitting queries to the match engine web server 24 through their browser program 16, to complete at least in part at least one questionnaire containing question(s) applicable to network users; the questions being preferably demographic, geographic, psychographic (multigraphic) in nature; in order to identify products, services, and benefits (PSBs) of interest to network users.

In a preferred embodiment of the present invention, the match engine web server 24 generates a match result list that includes relevant entries obtained from and formatted by, at least in part, the results of the bidding process conducted by the account management server 22. The match engine web server 24 generates a list of hypertext links to documents that contain information relevant to PSB criteria entered by the user at the client computer 12. The match engine web server transmits this list, in the form of a web page, to the network user, where it is displayed on the browser 16 running on the client computer 12. In addition, the match result list web page, an example of which is presented in FIG. 7, will be discussed below in further detail.

Match engine web server 24 is connected to the Internet 20. In a preferred embodiment of the present invention, match engine web server 24 includes a match database 40 comprised of PBS listing records used to generate match results in response to user queries. In addition, match engine web server 24 may also be connected to the account management server 22. Account management server 22 may also be connected to the Internet. The match engine web server 24 and the account management server 22 of the present invention address the different information needs of the users located at client computers 12.

For example, one class of users located at client computers 12 may be PSB providers such as advertising web site promoters or owners having advertiser web pages 30 located on advertiser web servers 14. These advertising web site promoters, or advertisers, may wish to access account information residing in storage 32 on account management server 22. An advertising web site promoter may, through the account residing on the account management server 22, participate in a competitive bidding process with other advertisers. An advertiser may bid on any number of PSB criteria relevant to the content of the advertiser's offerings and/or its web site. In one embodiment of the present invention, the relevance of one or more bidded criteria to an advertiser's web site is determined through a manual editorial process prior to insertion of the PSB listing containing the criteria and advertiser web site URL into the database 40. In an alternate embodiment of the present invention, the relevance of one or more bidded criteria in a PSB listing to the corresponding web site may be evaluated using a computer program executing at processor 34 of account management server 22, where the computer program will evaluate the criteria and corresponding web site according to a set of predefined editorial rules.

The higher bids receive more advantageous placement on the PSB result list page generated by the match engine 24 when a match request using the criteria bid on by the advertiser is executed. In a preferred embodiment of the present invention, the amount bid by an advertiser comprises a money amount that is deducted from the account of the advertiser for each time the advertiser's web site is accessed via a hyperlink on the PSB result list page. A PSB seeker "clicks" on the hyperlink with a computer input device to initiate a retrieval request to retrieve the information associated with the advertiser's hyperlink. Preferably, each access or "click" on a PSB result list hyperlink will be redirected to the match engine web server 24 to associate the "click" with the account identifier for an advertiser.

This redirect action, which is not readily apparent to the seeker, will access account identification information coded into the PSB result page before accessing the advertiser's URL using the PSB result list hyperlink clicked on by the seeker. The account identification information is recorded in the advertiser's account along with information from the retrieval request as a retrieval request event. Since the information obtained through this mechanism conclusively matches an account identifier with a URL in a manner not possible using conventional server system logs known in the art, accurate account debit records will be maintained. Optionally, the advertiser's web site description and hyperlink on the PSB result list page is accompanied by an indication that the advertiser's listing is a paid listing. Optionally, each paid listing displays a "cost to advertiser," which is an amount corresponding to a "price-per-click" paid by the advertiser for each referral to the advertiser's site through the PSB result list.

A second class of users at client computers 12 may comprise seekers seeking specific information on the web. The seekers may access, through their browsers 16, a match engine web page 36 residing on web server 24. The match engine web page 36 includes a questionnaire in which a seeker may type or otherwise enter answers to one or more questions concerning the seeker. Alternatively, the seeker may query the match engine web server 24 through a questionnaire hyperlinked to the match engine web server 24 and located on a web page stored at a remote web server. When the seeker has finished completing anywhere from one to, preferably, a required all of the questions in the questionnaire containing one or more questions, the seeker may transmit the query to the match engine web server 24 by clicking on a provided hyperlink. The match engine web server 24 will then generate a match result list page and transmit this page to the seeker at the client computer 12.

The seeker may click on the hypertext links associated with each listing on the PSB results page to access the corresponding web pages. The hypertext links may access web pages anywhere on the Internet, and include paid listings to advertiser web pages 30 located on advertiser web servers 14. In a preferred embodiment of the present invention, the match result list also includes non-paid listings that are not placed as a result of advertiser bids. The non-paid hypertext links may also include links manually indexed into the database 40 by an editorial team. Preferably, non-paid listings may appear among the paid advertiser listings. Optionally, the non-paid listings follow the paid advertiser listings on the match results page.

Figure 2:
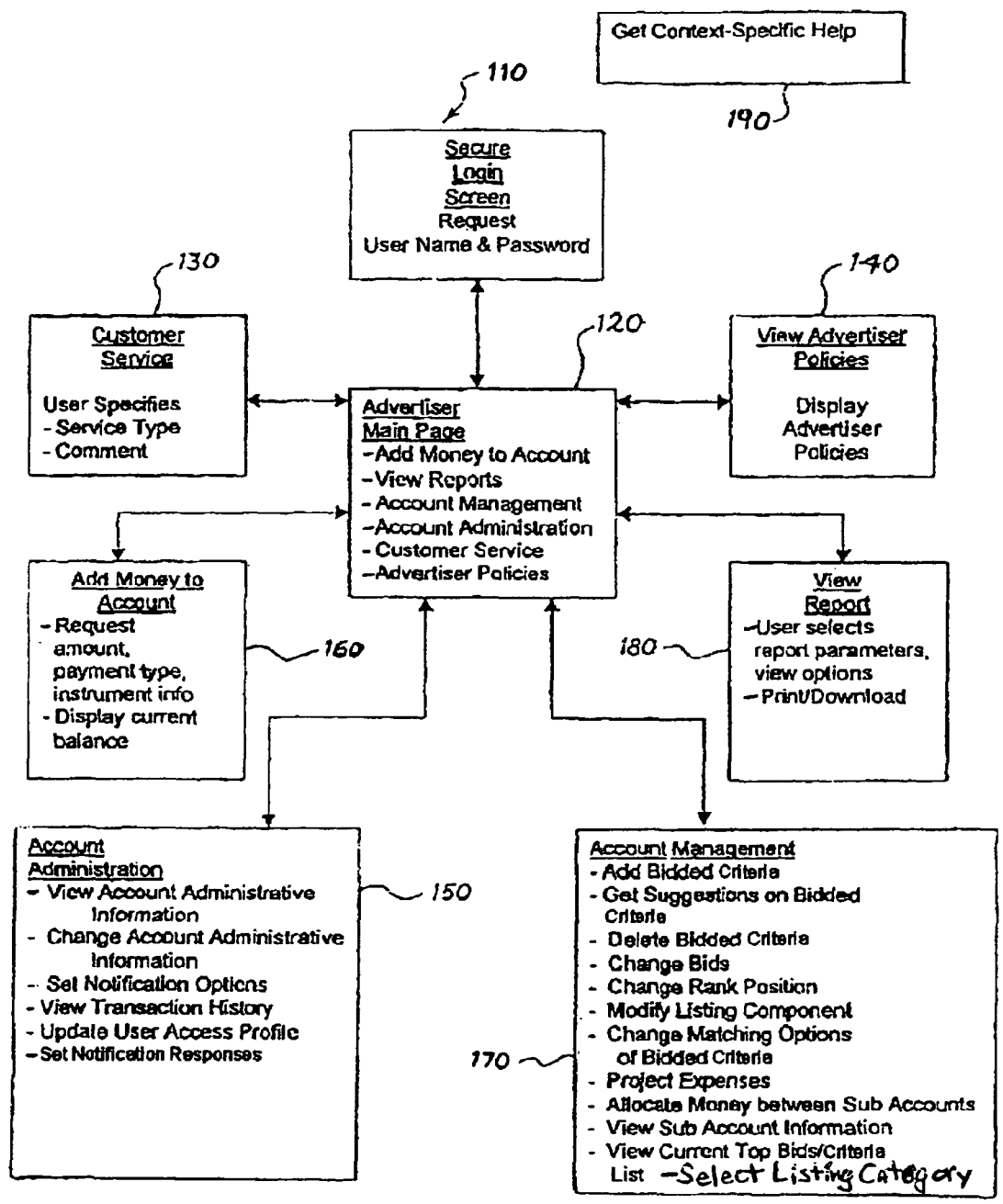
FIG. 2 is a chart of menus, display screens, and input screens used in one embodiment of the present invention.

FIG. 2 is a diagram showing menus, display screens, and input screens presented to an advertiser accessing the account management server 22 through a conventional browser program 16. The advertiser, upon entering the URL of the account management server 22 into the browser program 16 of FIG. 1, invokes a login application, discussed below as shown at screen 110 of FIG. 2, running on the processing system 34 of the server 22. Once the advertiser is logged-in, the processing system 34 provides a menu 120 that has a number of options and further services for advertisers. These items, which will be discussed in more detail below, cause routines to be invoked to either implement the advertiser's request or request further information prior to implementing the advertiser's request.

In one embodiment of the present invention, the advertiser may access several options through menu 120, including requesting customer service 130, viewing advertiser policies 140, performing account administration tasks 150, adding money to the advertiser's account 160, managing the account's advertising presence on the match engine 170, and viewing activity reports 180. Context-specific help 190 may also generally be available at menu 120 and all of the above-mentioned options.

Figure 3:
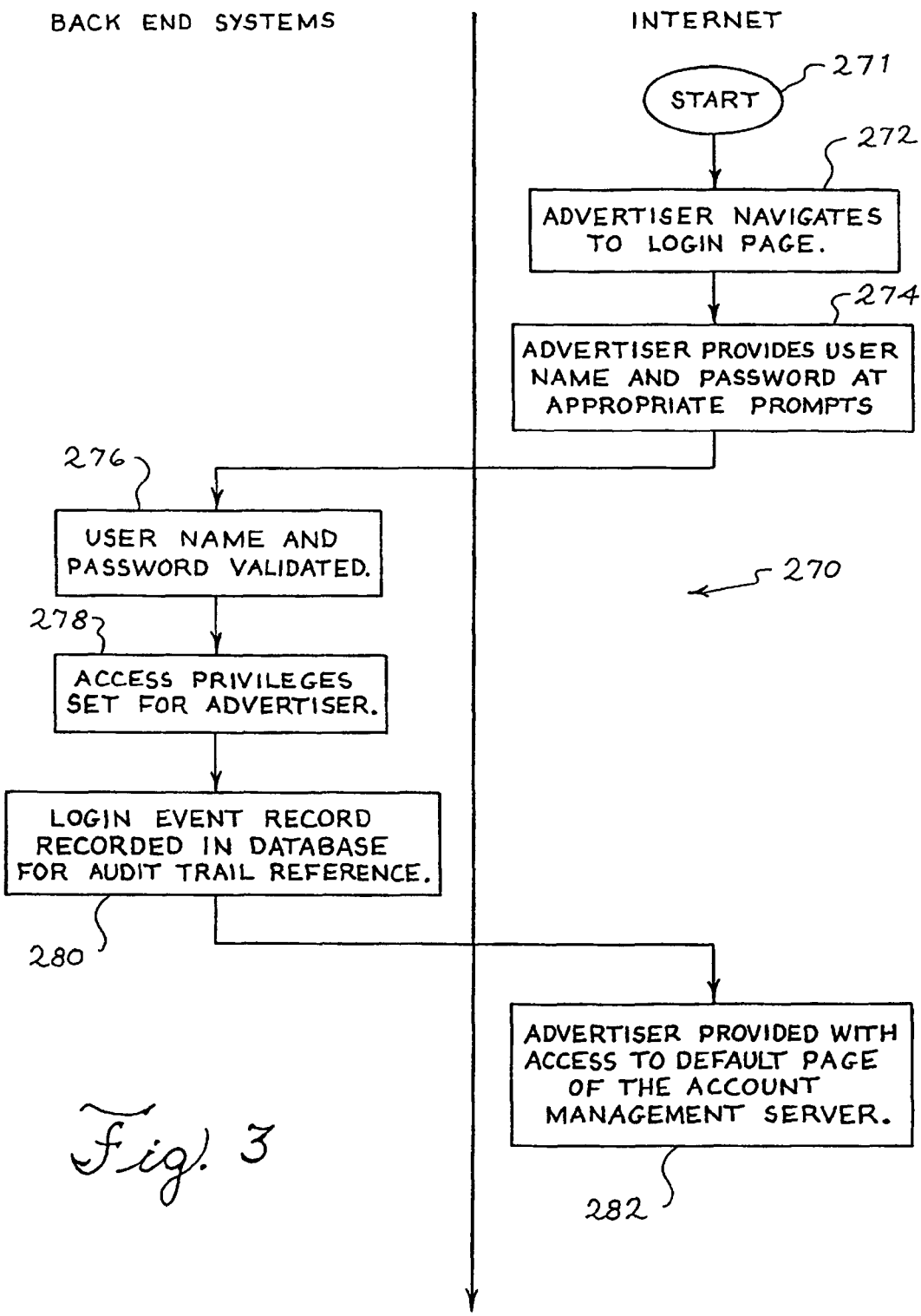
FIG. 3 is a flow chart illustrating the advertiser user login process performed in one embodiment of the present invention.
Figure 4:
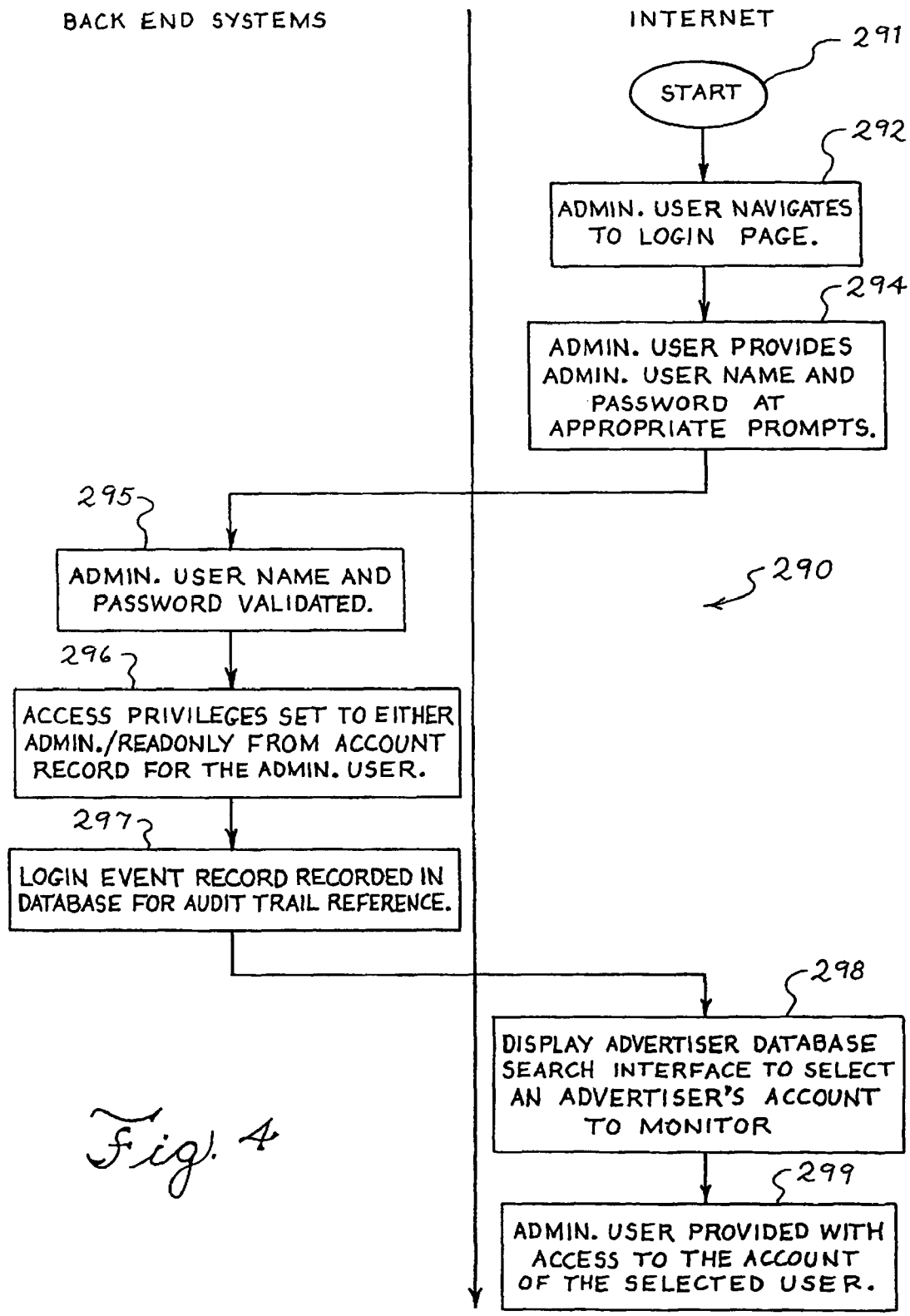
FIG. 4 is a flow chart illustrating the administrative user login process performed in one embodiment of the present invention.

The login procedure of the preferred embodiment of the present invention is shown in FIGS. 3 and 4 for two types of user. FIG. 3 shows the login procedures 270 for an advertiser, FIG. 4 shows the login procedures 290 for an administrator managing and maintaining the system and method of the present invention. As discussed above, the advertiser or administrator at a client computer 12 must first use a browser program at steps 271 or 291 to access the account management server. After the advertiser navigates to the URL of the login page to start the login process at step 272 or 292, the processing system 34 of the account management server 22 invokes a login application at steps 274 or 294. According to this application, the processor provides an input screen 110 (FIG. 2) that requests the advertiser's or administrator's user name and password. These items of information are provided at steps 276 or 295 to a security application known in the art for the purpose of authentication, based on the account information stored in a database stored in storage 32 of account management server 22.

According to FIG. 3, after the user has been authenticated as an advertiser, the advertiser is provided with the menu screen 120 of FIG. 2 and limited read/write access privileges only to the corresponding advertiser account, as shown in step 278. The advertiser login event 278 may also be recorded in step 280 in an audit trail data structure as part of the advertiser's account record in the database. The audit trail is preferably implemented as a series of entries in database 38, where each entry corresponds to an event wherein the advertisers account record is accessed. Preferably, the audit trail information for an account record may be viewed by the account owner and other appropriate administrators.

However, if the user is authenticated as an administrator in step 295 of FIG. 4, the administrator is provided with specified administrative access privileges to all advertiser accounts as shown in step 296. The administrator login event 296 is recorded in step 297 in the audit trail data structure portion of the administrator's account record. This audit trail is preferably implemented as a series of entries in database 38, where each entry corresponds to an event wherein the administrators account record is accessed. Most preferably, the administrator's audit trail information may be viewed by the account owner and other appropriate administrators.

Furthermore, instead of the general advertiser main menu shown to the authenticated advertiser users in step 282, the authenticated administrator is provided in step 298 with access to search the database 38 of advertiser accounts. Preferably, a database search interface is provided to the administrator that enables the administrator to select an advertiser account to monitor.

For example, the interface may include query boxes in which the administrator may enter an account number or username or contact name corresponding to an account the administrator wishes to access. When the administrator selects an advertiser account to monitor in step 299, the administrator is then brought to the main advertiser page 120 of FIG. 2, which is also seen by the advertisers.

Access to the account information 32 located on the account management server 22 is restricted to users having an account record on the system, as only those users are provided with a valid login name and password. Password and login name information is stored along with the user's other account information in the database 38 of the account management server 22, as shown in FIG. 1. Account information, including a login user name and password, is entered in the database 38 of FIG. 1 via a separate online registration process that is outside the scope of the present invention.

Figure 5:
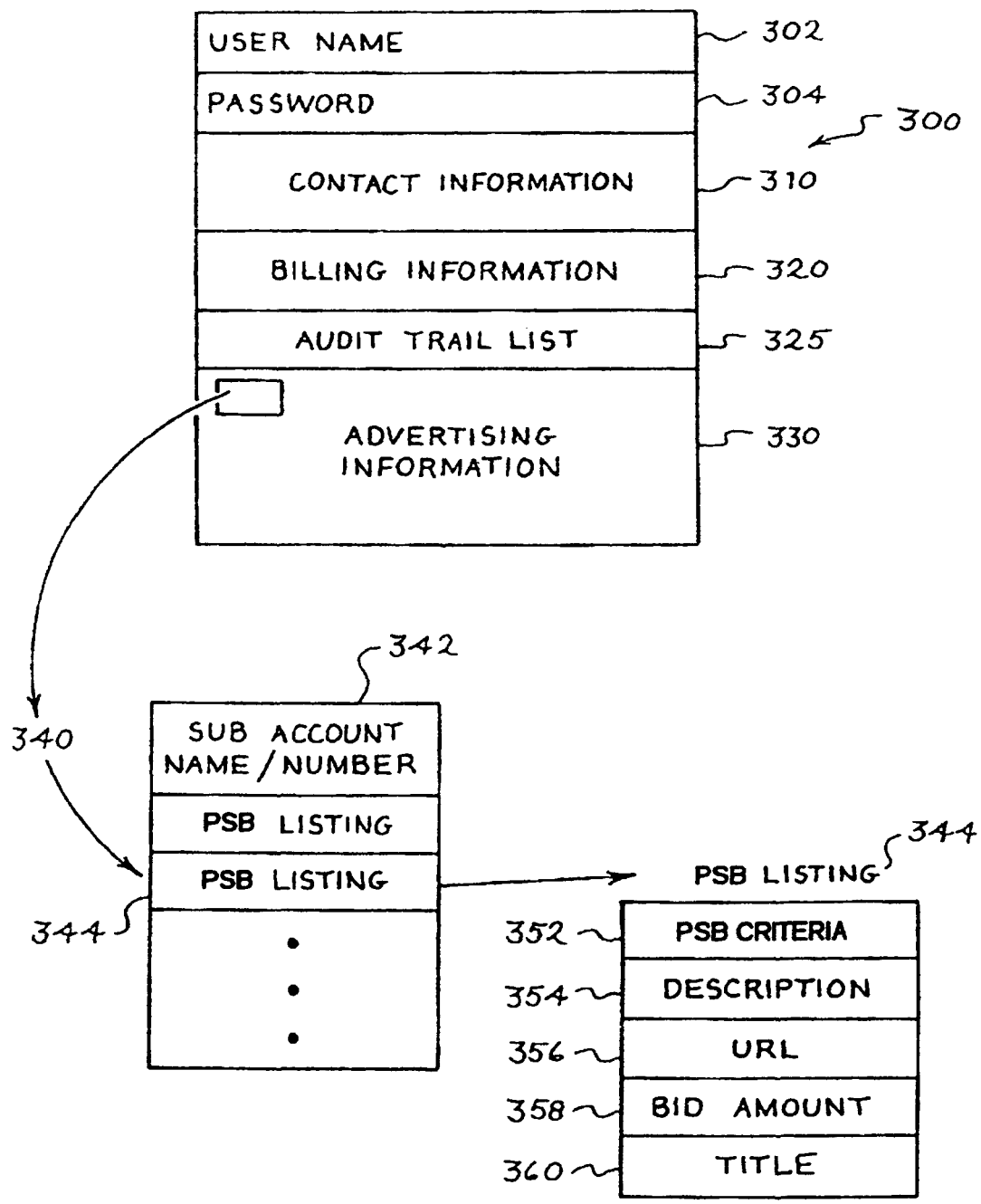
FIG. 5 is a diagram of data for an account record for use with one embodiment of the present invention.

FIG. 5 is a diagram showing the types of information contained in each advertiser account record 300 in the database. First, an advertiser account record 300 contains a username 302 and a password 304, used for online authentication as described above. The account record also contains contact information 310 (e.g., contact name, company name, street address, phone, e-mail address).

Contact information 310 is preferably utilized to direct communications to the advertiser when the advertiser has requested notification of key advertiser events under the notification option, discussed below. The account record 300 also contains billing information 320 (e.g., current balance, credit card information). The billing information 320 contains data accessed when the advertiser selects the option to add money to the advertiser's account. In addition, certain billing information, such as the current balance, may trigger events requiring notification under the notification option. The audit trail section 325 of an account record 300 contains a list of all events wherein the account record 300 is accessed. Each time an account record 300 is accessed or modified, by an administrator or advertiser, a short entry describing the account access and/or modification event will be appended to the audit trail section 325 of the administrator or advertiser account that initiated the event. The audit trail information may then be used to help generate a history of transactions made by the account owner under the account.

The advertising information section 330 contains information needed to conduct the online bidding process of the present invention, wherein a position is determined for preferably a web site description and hyperlink within a product/service/benefit (PSB) result list generated by a match engine. The advertising data 330 for each user account 300 may be organized as zero or more subaccounts 340. Each subaccount 340 comprises at least one PSB listing 344. Each PSB listing corresponds to a bid on one or more PSB criteria. An advertiser may utilize subaccounts to organize multiple bids on multiple PSB criteria sets (corresponding to multiple PSBs), or to organize bids for multiple web sites. Subaccounts are also particularly useful for advertisers seeking to track the performance of targeted market segments. The subaccount superstructure is introduced for the benefit of the advertisers seeking to organize their advertising efforts, and does not affect the method of operation of the present invention.

Alternatively, the advertising information section need not include the added organizational layer of subaccounts, but may simply comprise one or more PSB listings.

The PSB listing 344 corresponds to at least one criteria/bid pairing and contains key information to conduct the online competitive bidding process. Preferably, each PSB listing comprises the following information. PSB criteria 352, web site description 354, URL 356, bid amount 358, and a title 360. The PSB criteria 352 comprises one or more criteria factors, preferably of a demographic, geographic, psycographic, preference/interest nature (in any language). Each criterion factor in turn comprises a character string. The PSB criteria is the object of the competitive online bidding process. The advertiser selects at least one PSB criterion to bid on that is relevant to the content of the advertiser's web site and/or to their product, service, benefit, informational offering(s). Ideally, the advertiser may select (a) PSB criteria that is/are targeted to entity information/criteria entered by seekers desiring the information on the advertiser's web site, their products, services, benefits and/or information; although less common/less related PSB criteria may also be selected to ensure comprehensive coverage of relevant entity criteria for bidding.

The web site description 354 is a textual (optionally; and/or visual, audio, etc) description (of any suitable length/size) of the content of the advertiser's web site (and/or their PSB[s]) and may be displayed as part of the advertiser's entry in a PSB result list. The PSB listing 344 may also contain a title 360 of the web site that may be displayed as the hyperlinked heading to the advertiser's entry in a PSB result list. The URL 356 contains the Uniform Resource Locator address of the advertiser's web site. When the user clicks on the hyperlink provided in the advertiser's result list entry, the URL is provided to the browser program. The browser program, in turn, accesses the advertiser's web site through the redirection mechanism discussed above. The URL may also be displayed as part of the advertiser's entry in a PSB result list. Alternatively, since millions of product, service, and benefit providers (especially small to medium sized companies and professional practices) do not have websites, the current invention's system administrator itself may optionally provide such web sites, "landing pages," and/or other "destinations" where further information, and/or including contact information, concerning these providers may be provided/displayed to the PSB seeker; Thereby negating the need for a PSB provider to have a web site, web site title, or URL.

The bid amount 358 preferably is a money amount bid by an advertiser for a listing. This money amount is deducted from the advertiser's prepaid account or is recorded for advertiser accounts that are invoiced for each time a match request is executed by a user on the corresponding PSB criteria and the PSB result list hyperlink is used to refer the seeker to the advertiser's web site. Finally, a rank value is a value generated dynamically, preferably by the processing system 34 of the account management server 22 shown in FIG. 1, each time an advertiser places a bid or a seeker enters a PSB query. The rank value of an advertiser's PSB listing determines the placement location of the advertiser's entry in the PSB result list generated when a PSB match request is executed on the corresponding PSB criteria. Preferably, rank value is an ordinal value determined in a direct relationship to the bid amount 358; the higher the bid amount, the higher the rank value, and the more advantageous the placement location on the PSB result list.

Most preferably, the rank value of 1 is assigned to the highest bid amount with successively higher ordinal values (e.g., 2, 3, 4, . . . ) associated with successively lower ranks and assigned to successively lower bid amounts.

In one embodiment, each bid may be dependent upon or require satisfaction of various criteria which must be met in order for the bid amount to remain the same; or for the listing to remain on the results list and displayed to a seeker at all. For example, thanks to the current invention's dynamic, substantially in real time nature, an advertiser might specify that for the first 1,000 times within a given time period, every time their listing is clicked, they are paying $2.37/click. Thereafter (though the position of their listing will normally drop for doing so), for the remainder of the given time period, they will pay $1.02/click. Alternatively, the advertiser could elect to have their listing dropped entirely after those 1,000 clicks. In another example, an advertiser could designate a certain time of day (time zone determinate), only during which its listings are to appear. It is to be understood that the amount bid may be dependent on as many criteria as is deemed desirable by the system operator and its advertisers. As can be readily seen, a virtually limitless number of bidding parameters, whether simple or complex, may be readily utilized with the current system; all being well within the present invention's scope.

Once logged in, an advertiser can perform a number of straightforward tasks set forth in menu 120 of FIG. 2, including viewing a list of rules and policies for advertisers, and requesting customer service assistance. These items cause routines to be invoked to implement the request. For example, when "Customer Service" is selected, an input screen 130 is displayed to allow the advertiser to select the type of customer service requested. In addition, forms may be provided on screen 130 so that an advertiser may type a customer comment into a web-based input form.

When "View Advertiser Policies" is selected, a routine will be invoked by processing system 34 of the account management server 22 FIG. 1. As shown in FIG. 2, the routine will display an informational web page 140. The web page 140 sets forth the advertiser policies currently in effect (e.g., "All PSB listing descriptions must clearly relate to the PSB criteria").

Menu 120 of FIG. 2 also includes an "Account Administration" selection 150 which allows an advertiser, among other things, to view and change the advertiser's contact information and billing information, or update the advertiser's access profile, if any. Web-based forms well known in the art and similar to those discussed above are provided for updating account information.

The "Account Administration" menu also includes a selection enabling an advertiser to view the transaction history of the advertiser's account. Under the "View Transaction History" selection, the advertiser may invoke routines to view a listing of past account transactions (e.g., adding money to account, adding or deleting bidded PSB criteria, or changing a bid amount). Additional routines may be implemented to permit advertisers to display a history of transactions of a specified type, or that occur within a specified time frame. The transaction information may be obtained from the audit trail list 325 of FIG. 5, described above.

Clickable buttons that may be implemented in software, web-based forms, and/or menus, etc. may be provided as known in the art to enable advertisers to specify such limitations.

In addition, the "Account Administration" menu 150 of FIG. 2 includes a selection enabling an advertiser to set notification options. Under this selection, the advertiser may select options that will cause the system to notify the advertiser when certain key events have occurred. For example, the advertiser may elect to set an option to have the system send conventional electronic mail messages to the advertiser when the advertises account balance has fallen below a specified level. In this manner, the advertiser may receive a "warning" to replenish the account before the account is suspended (meaning the advertiser's listings will no longer appear in PSB result lists). Another key event for which the advertiser may wish notification is a change in position of an advertiser's listing in the PSB result list generated for (a) particular PSB criteria. For example, an advertiser may wish to have the system send a conventional electronic mail message to the advertiser if the advertiser has been outbid by another advertiser for a particular PSB criteria (set) (meaning that the advertiser's listing may appear in a position farther down on the PSB result list page than previously). When one of the system-specified key events occurs, a database search is triggered for each affected PSB listing. The system will then execute the appropriate notification routine in accordance with the notification options specified in the advertiser's account. Preferably, advertiser has previously established various parameters in its account 170 whereby when such notifications are "sent out," preferably notification-concurrent actions are automatically taken to address the condition(s) present which caused the notification in the first place e.g., as in the case where the notified advertiser's bid on a given PSB criteria is automatically increased by some amount as a result of another competing advertiser's change in position within the PSB result list.

Referring back to FIG. 2, a selection also appears in menu 120 that permits an advertiser to add money to the advertiser's account, so that the advertiser will have funds in their account to pay for referrals to the advertiser's site through the PSB results page. Preferably, only advertisers with funds in their advertiser's accounts may have their paid listings included in any PSB result lists generated. Most preferably, advertisers meeting selected business criteria may elect, in place of maintaining a positive account balance at all times, incur account charges regardless of account balance and pay an invoiced amount at regular intervals which reflects the charges incurred by actual referrals to the advertiser's site generated by the match engine. The process that is executed when the "Add Money to Account" selection is invoked is shown in further detail in FIG. 6, beginning at step 602. When the "Add Money to Account" selection is clicked in step 604, a function is invoked which receives data identifying the advertiser and retrieves the advertiser's account from the database. The executing process then stores the advertiser's default billing information and displays the default billing information for the advertiser in step 606. The displayed billing information includes a default amount of money to be added, a default payment type, and default instrument information.

In the preferred embodiment of the present invention, an advertiser may add funds online and substantially in real time through the use of a credit card, although the use of other payment types are certainly well within the scope of the present invention. For example, in an alternate embodiment of the present invention, advertisers may add funds to their account by transferring the desired amount from the advertiser's bank account through an electronic funds verification mechanism known in the art such as debit cards, in a manner similar to that set forth in U.S. Pat. No. 5,724,424 to Gifford. In another alternate embodiment of the present invention, advertisers can add funds to their account using conventional paper-based checks. In that case, the additional funds may be updated in the account record database through manual entry. The instrument information includes further details regarding the type of payment. For example, for a credit card, the instrument information may include data on the name of the credit card (e.g., MasterCard, Visa, or American Express), the credit card number, the expiration date of the credit card, and billing information for the credit card (e.g., billing name and address).

In a preferred embodiment of the present invention, only a partial credit card number is displayed to the advertiser for security purposes.

The default values displayed to the advertiser are obtained from a persistent state, e.g., stored in the account database. In an embodiment of the present invention, the stored billing information values may comprise the values set by the advertiser the last (e.g. most recent) time the process of adding money was invoked and completed for the advertiser's account. The default billing information is displayed to the advertiser in a web-based form. The advertiser may click on the appropriate text entry boxes on the web-based form and make changes to the default billing information. After the advertiser completes the changes, the advertiser may click on a hyperlinked "Submit" button provided on the form to request that the system update the billing information and current balance in step 608. Once the advertiser has requested an update, a function is invoked by the system which validates the billing information provided by the advertiser and displays it back to the advertiser for confirmation, as shown in step 610. The confirmation billing information is displayed in read-only form and may not be changed by the advertiser.

The validation step functions as follows. If payment is to be debited from an advertiser's external account, payment may be authenticated, authorized and completed using the system set forth in U.S. Pat. No. 5,724,424 to Gifford. However, if the payment type is by credit card, a validating algorithm is invoked by the system, which validates the credit card number using a method such as that set forth in U.S. Pat. No. 5,826,241 to Stein et al. The validating algorithm also validates the expiration date via a straightforward comparison with the current system date and time. In addition, the function stores the new values in a temporary instance prior to confirmation by the advertiser.

Once the advertiser ascertains that the displayed data is correct, the advertiser may click on a "Confirm" button provided on the page to indicate that the account should be updated in step 612. In step 612, a function is invoked by the system which adds money to the appropriate account balance, updates the advertisers billing information, and appends the billing information to the advertiser's payment history. The advertiser's updated billing information is stored to the persistent state (e.g., the account record database) from the temporary instance.

Within the function invoked at step 612, a credit card payment function may be invoked by the system at step 614. In an alternate embodiment of the present invention, other payment functions such as debit card payments may be invoked by defining multiple payment types depending on the updated value of the payment type.

If the payment type is credit card, the user's account is credited immediately at step 616, the user's credit card having already been validated in step 610. A screen showing the status of the add money transaction is displayed, showing a transaction number and a new current balance, reflecting the amount added by the just-completed credit card transaction.

In an alternate embodiment of the present invention, after the money has been added to the account, the amount of money added to the account may be allocated between subaccounts the end of the add money process at step 616. If the advertiser has no subaccounts, all of the money in the account is a general allocation. However, if the advertiser has more than one subaccount, the system will display a confirmation and default message prompting the advertiser to "Allocate Money Between Subaccounts".

Figure 6:
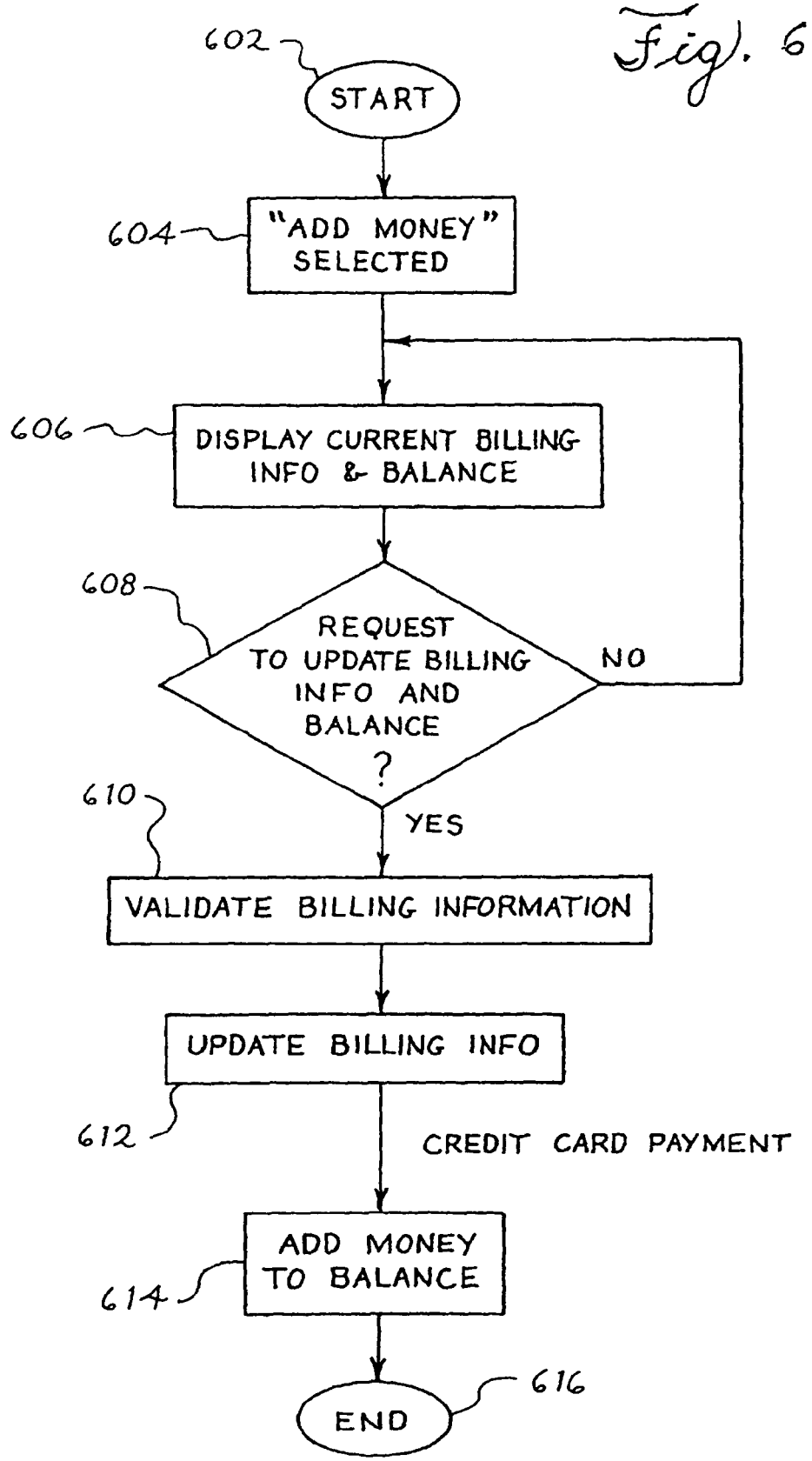
FIG. 6 is a flow chart illustrating a method of adding money to an account record used in one embodiment of the present invention.

The menu selection "Allocate Money Between Subaccounts" may be invoked when money is added to the advertiser account after step 616 of FIG. 6, or it may be invoked within the "Account Management" menu 170 shown in FIG. 2. The "Account Management" menu 170 is accessible from the Advertiser Main Page 120, as shown in FIG. 2. This "Allocate Money Between Subaccounts" menu selection permits an advertiser to allocate current and any pending balances of the advertiser's account among the advertisers subaccounts. The system will then update the subaccount balances. The current balance allocations will be made in real or near real time, while the pending balance allocations will be stored in the persistent state. A routine will be invoked to update the subaccount balances to reflect the pending balance allocations when the payment for the pending balance is processed. Automatic notification may be sent to the advertiser at that time, if requested. This intuitive online account management and allocation permits advertisers to manage their online advertising budget quickly and efficiently. Advertisers may replenish their accounts with funds and allocate their budgets, all in one easy web-based session. The computer-based implementation eliminates time consuming, high cost manual entry of the advertiser's account transactions.

The "Allocate Money Between Subaccounts" routine begins when an advertiser indicates the intent to allocate money by invoking the appropriate menu selection at the execution points indicated above. When the advertiser indicates the intent to allocate, a function is invoked by the system to determine whether there are funds pending in the current balance (i.e., unactivated account credits) that have not yet been allocated to the advertiser's subaccounts, and displays the balance selection options. In a preferred embodiment of the present invention, an account instance is created and a pending current balance account field is set from the persistent state.

If there are no unallocated pending funds, the system may display the current available balances for the account as a whole as well as for each subaccount. The advertiser then distributes the current available balance between subaccounts and submits a request to update the balances. A function is invoked which calculates and displays the current running total for subaccount balances. The current running total is stored in a temporary variable which is set to the sum of current balances for all subaccounts for the specified advertiser. The function also validates the new available subaccount balances to make sure that the total does not exceed the authorized amount. If the new advertiser-set available subaccount balances does not exceed the authorized amount, a function is invoked which will update all of the subaccount balances in the persistent state and display the update in read-only format.

If there are pending funds in the current account balance, the pending funds must be allocated separately from the available current balance. The pending funds will then be added into the available current balance when the funds are received. The function must therefore prompt the advertiser to choose between allocating pending funds or allocating available funds. The allocating pending funds selection works in much the same manner as the allocating available funds selection outlined above. After the advertiser chooses to allocate pending funds, a routine is invoked to display current pending balances for the account and the subaccounts. The advertiser distributes the pending subaccount balances between campaigns and submits a request to update the balances. A function is invoked which calculates and displays the current running totals for the pending subaccount balances. This function also validates the new pending subaccount allocations to make sure that the allocations do not exceed any authorized amount. The current running total of pending allocations is set to the sum of current pending balances for all subaccounts for the advertiser. If the new user-set pending subaccount balances or the total of such balances do not exceed any authorized amount, the function will update all of the pending subaccount allocations in the persistent state, e.g. the advertiser's account in the database, and display the update in read-only format.

As indicated above and shown in FIG. 2, a routine displaying the account management menu 170 may be invoked from the advertiser main menu 120. Aside from the "Allocate Money Between Subaccounts" selection described above, the remaining selections all use to some extent the PSB criteria present in the advertiser's account on the database, and may also affect the advertiser's entry in the PSB result list. Thus, a further description of the PSB result list generated by the match engine is provided at this point.

When a remote product/service/benefit/information seeker accesses the questionnaire/criteria query page on the match engine web server 24 and executes a PSB match request according to the procedure described previously, the match engine web server 24 preferably generates and displays a PSB result list where one or more criteria of preferably each PSB listing in the PSB result list preferably exactly matches at least one of the PSB criteria of the match request query entered by the remote seeker.

Alternatively, "canonicalized" criteria of (a) PSB listing(s) in the PSB result list may preferably exactly match the canonicalized match request query entered by the remote seeker.

The canonicalization of criteria factors/terms (when applicable) used in queries and PBS listings removes common irregularities of criteria factors/terms entered by seekers and web site promoters (product/service/benefit/information providers); such as capital letters and pluralizations, in order to generate relevant results. In another embodiment, the match engine web server 24 may generate and display a PSB result list where one or more criteria of at least one PSB listing in the PSB result list does not exactly match at least one of the PSB criteria of the match request query entered by the remote seeker.

However, alternate schemes for determining a match between the criteria of the PSB listing and the match request query entered by the remote seeker are well within the scope of the present invention. For example, string matching algorithms known in the art may be employed to generate matches where the PSB criteria of the PSB listing and the match request query have the same root but are not exactly the same (e.g., reader vs. reading). Alternatively a thesaurus database of synonyms may be stored at match engine web server 24, so that matches may be generated for (a) PSB criteria having synonyms. Internationalization methodologies may be employed to refine PSB match requests for users outside the United States. For example, country or language-specific PSB results may be generated, by a cross-reference of the advertiser account database.

Numerous types/versions/formats/presentations/instantiations of the questionnaire/survey/profile e.g.; including variations in the number, type, and format of the questions/data asked/supplied, including preferably those of a demographic, geographic, psychographic, firmographic, preference/interest/usage/future usage nature; the answers to be supplied by the PSB seekers, with or without personally-identifying information, etc, have been used for many decades and are well within the knowledge of those in the art. Accordingly, no attempt will be made here to attempt to detail every possible version of such standard questionnaires/surveys/profiles, as the options are virtually limitless. Any questionnaire deemed suitable (e.g., by the system administrator) for the system of the present invention may be utilized. Note, however, that the architecture for and procedures to implement questionnaires is not conventional, in the bidded-position, pay for performance system of matching PSB providers with PSB seekers as detailed herein.

The questionnaire may use any means Suitable to complete the questionnaire e.g., click on an icon, place an "X," "check," or other mark on, next to, or nearby a selection, fill in a box, drop-down menus; or any other means known in the art for indicating a choice or selection of one or more items from a list on or off of a web page. The questionnaire may also make use of specific numbers and figures, letters and letter combinations, number/letter combinations, words, range(s), range(s) of number(s), value range(s), etc; and/or any other means as is well known in the art for completing the questions of a questionnaire on or of a web page. FIG. 10 illustrates an example of a seeker questionnaire which may be used in one embodiment of the present invention. While in a preferred embodiment, all the questions are "closed-ended;" that is, where a seeker is given a finite selection of specified answers from which to choose for each question; in another embodiment, one or more of the questions may be "open-ended," where there are no specific, predetermined answer(s), and seeker is free to "share its thoughts" in their own words.

In such an "open-ended" embodiment, the well-known-to-the-arts natural language processing (NLP) (computational linguistics) or some other method as is well known to the arts may be used in order to assist the system operator in minimizing human involvement in the correlation of the seeker's questionnaire information with that of the advertisers chosen criteria.

Possible questionnaire questions/data requests for individuals may include name, address, e-mail address, telephone number, date of birth/age, income (exact dollar amount or range), marital status, presence of children (number, ages, sex), occupation, education level, credit cards used, credit score(s), whether homeowner or renter, interests and activities (e.g., bicycling, golf, running, bowling, snow/water skiing, reading, fishing, craps, Internet surfing, photography, travel [cruise, car, plane, train], wines, coin/stamp collecting, watching TV, etc.), Also; products owned/used (auto make, model, year; when/where/why/how bought/paid for), services used, current/future intentions (with or without time periods/ranges; getting married, having a baby, buying/selling a home; buying/leasing a new vehicle, RV, boat, aircraft, or any other product, etc), medical/health status and conditions present (asthma, arthritis, high blood pressure, cancer, etc), types of investments made, social concerns, insurance types held/desired, musical preferences, nutrition and diet.

In other "non-human" entity system applications (e.g. business to business, business to government, government to government, etc), the requisite questionnaire(s) will of necessity utilize questions and "data indicators" appropriate to those applications and markets (e.g. firmographics) These other entity applications are well within the scope of the all-entity enablement of the present invention.

Preferably, personally-identifying questions are excluded from the questionnaire in order to maximize system's desirability and use by seekers. If any individual advertisers desire to require personal information (or other information not initially requested by the system's initial questionnaire) as a condition of—or to qualify for—obtaining their offering(s) (such as with government programs, tobacco and alcohol companies, etc), such information may optionally be collected after the seeker has submitted its match query but before delivery of the advertiser's information concerning its product, service, benefit, or information offering(s) to the seeker; via the presentation/delivery to the seeker of an additional or supplemental questionnaire to be completed. In a similar manner, additional questions may be presented to the seeker, at any time during the process, depending, for example, on seeker's answers/responses to various questions as seeker proceeds through the questionnaire (e.g., as when clicking from one page of a questionnaire to the next). This may be repeated any number of times as is deemed suitable.

Though the present system is fully operational with as few as one question (e.g., just the seeker's zip code, city, or sex) in the questionnaire being answered; the more questions answered, and answered as precisely as possible, the more comprehensive and useful the system is to the seeker (and to the advertisers). Accordingly, it is to be understood that the present invention does not require that the presented questionnaire be completed in its entirety by the seeker, in order to be presented with a results list; only that at least one of the questions/data fields of the questionnaire be answered/completed; in order to produce matches with at least some of the advertiser(s).

That said, in order to maximize the systems effectiveness and usefulness to all parties (the advertiser/providers, the seekers, and the system operator), in a most preferred embodiment the system operator does require that the questionnaire be completed in its entirety in order to receive a result list. Alternatively, at least one or more certain "high-importance" specified question(s) may be required to be completed/answered in order for seekers to receive a results list at all. No attempt shall be made here to list all possible modifications and variations given the near impossibility of doing so. Any and all such options/embodiments are well within the scope of the present invention.

It is to be understood that alternate schemes for obtaining the needed information/data from entities for its correlation with the advertiser/providers are well within the scope of the present invention. While their use is preferred, questionnaire/survey/profiles are not required. For example, entity match requests may be integrated in whole or in part with existing or future search engine technologies/methodologies (or even other applications), e.g., instead of the use of a questionnaire in order to obtain the needed entity criteria, an entity could simply enter one or more of their criterion directly into a search engines query box/field (even optionally along with one or more search terms) e.g., as in the following (or some similar or related) manner:

$50,000-$74,999+F+37+CA+91360+MC+Sports;

wherein this data corresponds to:

Household Income+Sex+Age+State of Residence+Zip Code+whether or not Minor Children are in the household+Likes/Dislikes/Hobbies/Activities Drop down boxes may be utilized to quickly and easily guide a seeker through such a process. As is obvious, in such a version, some type of indication/election will of necessity need to be made by entity in order to designate that a match request is being made of the match engine; either instead of, in addition to, or subsequent to a search request being conducted on the search engine; in order for seeker to obtain the PSB result list they desire. This is so, because, as is now understood; search engines by definition are unable to produce match results just as match engines by definition are unable to produce search results. In a related embodiment, an additional (preferably close to the search box) query/field box separate from the search query/field box may be used in this manner; preferably where the match request is processed at substantially the same time as the search request is. In this way, the curious and anxious searcher/seeker will concurrently discover both what they're looking for (via Search and Match) AND what they didn't know was already theirs to claim (via Match). Any and all such "questionnaire-free" criteria-acquisition variations/embodiments are well within the scope of the present invention.

Figure 7:
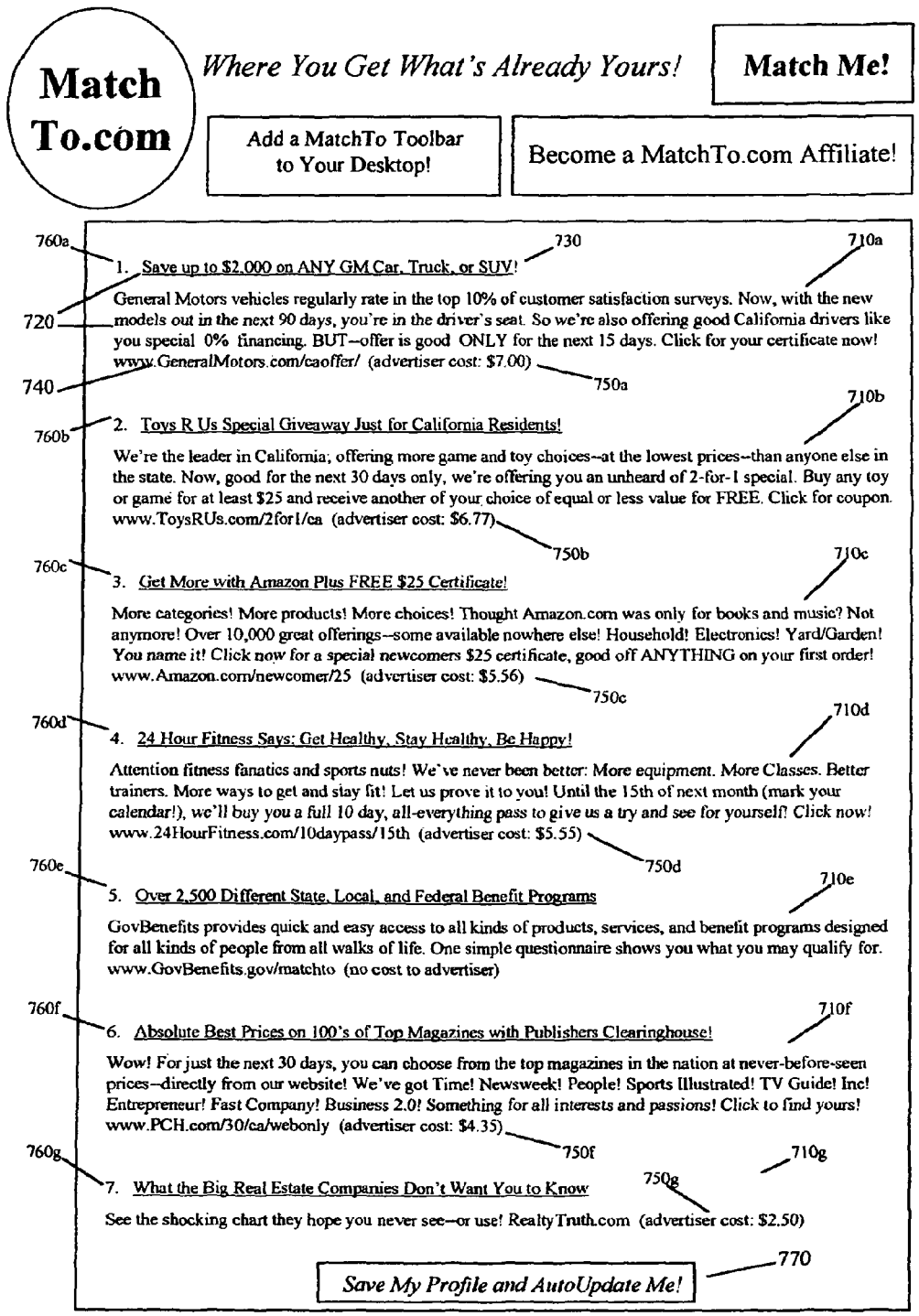
FIG. 7 illustrates an example of a PSB match result list generated by one embodiment of the present invention.

An example of a PSB result list display used in an embodiment of the present invention is shown in FIG. 7, which is a display of the first few entries resulting from a match request query from a seeker with the following criteria factors (characteristics):

Female+Age 37+$50,000-$74,999 Total Household Income+Minor Children in Household+California Resident+Enjoys Sports As shown in FIG. 7, a single entry, such as entry 710*a* in a PSB result list consists of a description 720 preferably of a web site, preferably comprising a title and a short textual description, and preferably a hyperlink 730 which, when clicked by a seeker, directs the seeker's browser preferably to the URL where the described web site is located. The URL 740 may also optionally be displayed in the PSB result list entry 710*a*, as shown in FIG. 7. The "click through" of a result item occurs when the remote seeker viewing the PSB result list display 710 of FIG. 7 selects, or "clicks" on the hyperlink 730 of the PSB result list display 710. In order for a "click through" to be completed, the seeker's click should be recorded at the account management server and redirected to the advertiser's URL via the redirect mechanism discussed above.

PSB result list entries 710*a*-710*g* may also show the rank value, 760*a* through 760*g*, of the advertiser's listing. The rank valve is an ordinal value, preferably a number, generated and assigned to the PSB listing by the processing system 34 of FIG. 1. Preferably, the rank value is assigned through a process, implemented in software, that establishes an association between the bid amount, the rank, and the criteria of a PSB listing. The process gathers all advertiser listings having criteria sets wherein at least one criterion of each advertiser criteria set matches at least one criterion of the seeker; but only where the advertiser criteria sets DO NOT contain any criteria which does not match the criteria of the seeker (further explained below). Then it sorts the listings in order from highest to lowest bid amount, and assigns a rank value to each listing in order. The highest bid amount receives the highest rank value, the next highest bid amount receives the next highest rank value, proceeding to the lowest bid amount, which receives the lowest rank value. Most preferably, the highest rank value is 1 with successively increasing ordinal values (e.g., 2, 3, 4, . . . ) assigned in order of successively decreasing rank. The correlation between rank value and bid amount is illustrated, in FIG. 7, where each of the paid advertiser list entries 710*a* through 710*d* and 710*f* and 710*g* display the advertiser/providers' bid amounts 750*a* through 750*d* and 750*f* and 750*g* for that entry.

In a preferred embodiment, where seekers are required to complete the entire questionnaire as a condition of receiving a result list at all, the system and method of FIG. 1 implement result list placement logic which may, by way of example and not limitation, be summarized by the following rules:

1. You may at all times create and bid on any criteria (characteristics) set you desire; your set containing anywhere from as few as one criterion factor (e.g. just one or more of the 40,000+Zip Codes) up to and including all of our available criteria factors. You're always able to decide for yourself how best to target your products, services, and benefits to your customers/clients, You always control exactly who receives your offers, and, often just as important, who doesn't. (Don't even try getting this kind of pinpoint targeting and control from search engine marketing [SEM] or search engine optimization [SEO]—because you can't.)

2. Your listing/advertisement will be delivered/presented only to seekers meeting at least your complete criteria set; whether your set consists of one criterion . . . or 25.

3. We will place you at the position you requested among others targeting the same exact criteria set at the lowest price possible.

4. There is at all times a minimum bid of $1.00 per criteria set; regardless of the number of or type of criterion factors chosen.

5. Minimum bid increments are $0.01.

6. In order to maximize seekers attention to and interest in their result lists, unpaid listings may at system operator's sole discretion be placed anywhere before, after, or among the paid listings.

7. If and when result lists are arranged/displayed in categories, a higher amount bid listing will always appear above a lower amount bid listing; regardless of the criteria set selected by each advertiser/provider for each of their respective listings. Ties under this particular scenario will be broken by date of listing; earliest on top, $2^{nd}$ earliest $2^{nd}$, $3^{rd}$ earliest $3^{rd}$, etc (referring here to positions among the tied listings; not to positions within the entire result list).

8. Subject to any criteria bid caps you may have set, if there are ties between you and one or more other advertisers sharing the same exact criteria set that make your requested position unavailable, we will make your new bid $0.01 more than the tie amount and you will be right on top of the ties. This means you might get a position higher than you requested.

9. If your requested position cannot be obtained because your bid cap is too low, we will get you the best position for your bid cap. Often that means that your new bid will be equal to your bid cap, but if we can get that same position for a lower price, we will give you the lower price.

10. You bid only against others also targeting your exact same criteria set. Your "Current Rank" and "Bid to Become #1" components are valid as between you and the other advertisers targeting this exact same criteria set [FIG. 9]. When seekers submit queries, your "current rank" and "bid to become number one" may not represent your listing's position within the result list presented to a given seeker. This is due to the required inclusion in the seeker's result list of any and all advertisers having one or more criterion factors in common with any of the seeker's criterion factors except when such advertiser criteria sets ALSO contain any criterion factors which contradict any of the seeker's criteria (this will be further explained below). Advertisers who's criteria sets both match in whole or in part seeker's criteria set AND which also includes additional criteria beyond seeker's, because in such cases the advertisers have indicated a desire for even greater specificity, are not displayed.

Figure 9:
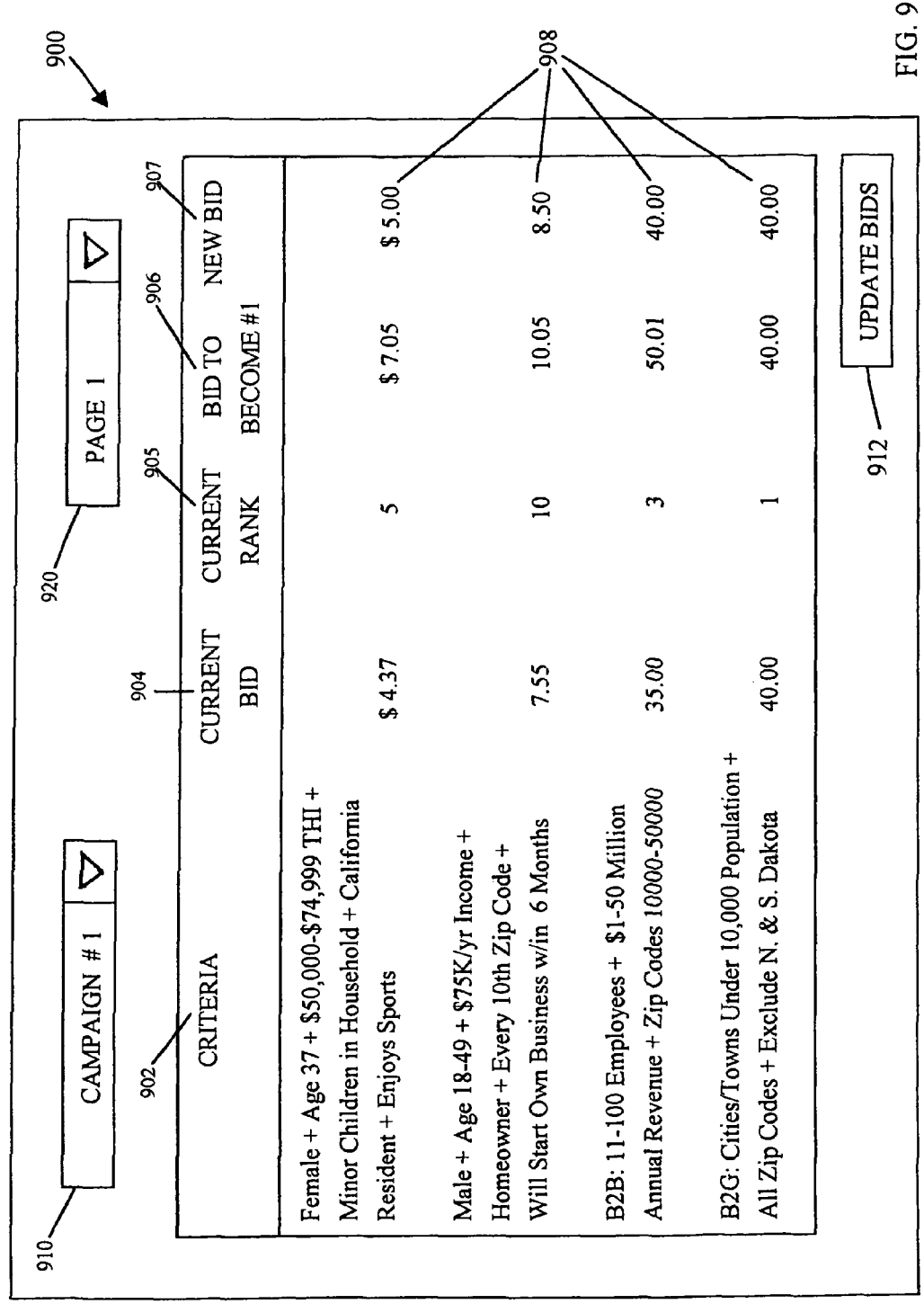
FIG. 9 illustrates an example in one embodiment of a screen display used in the change bids process of FIG. 8.

Though they could be the same occasionally; in the majority of the cases, your listing will normally differ from the "current rank" and "bid to become #1" numbers shown in your change bids selection screen(s) [FIG. 9]. There is no need, however, to be concerned about this phenomena. Remember that because you only pay when a targeted, pre-screened seeker who in the very least meets ALL of your designated criteria and then actually clicks on your ad and visits your website, your exact position within any particular result list is far less important than is your position among the group of companies (potentially including some of your competitors) directly targeting the same exact people you are. That's where your position matters the most. That's where you'll want to "fight" for the best placement you can afford.

In addition, because in no case will bids of a lesser value appear above/ahead of bids of a greater value in ANY result list provided to ANY seeker, as per our rules, no advertiser with a lower bid than you (which bid is, as stated, on their own criteria set) will ever appear above your listing in ANY result list. You invest more; you receive more. No matter what your position on individual result lists are. It's as simple as that.

11. All paid advertisers must have at least one criterion factor in common with seeker and no factors which are contradictory with any of seeker's criteria in order to appear on that seeker's result list. Each generated result list contains any and all advertiser/providers having at least one criterion factor in common with the seeker's criteria/data; where no criteria of any advertiser is a contradiction with any of seeker's criteria/data. This is how we insure that seekers receive ONLY listings (including yours!) which are relevant to each seeker (and to your website/offer/products/services/etc); and none that aren't.

These rules are exemplary only. Other rules may be readily devised and applied, individually or in combination with each other, as well. For example, as stated, instead of being the preferred, sole determining listing placement factor, a criteria (characteristics) set bid may in other embodiments be just one of two or more factors used to determine placement within (a) result(s) list(s). By way of example and not limitation, such other result list placement factors could include an ads actual or projected popularity and/or click through rate (CTR), popularity and/or importance and/or desirability of various criteria to the seeker(s) and/or advertiser(s) and/or system operator(s), relationship of an/the advertiser(s) and/or seeker to the system operator, advertiser cost of one or more of the criteria (i.e. where the inclusion of particular higher cost/higher value criteria results in even higher result list placement), seekers geographic location relative to one or more of the advertisers, credit standing of the advertisers (relative to each other and/or to some established standard, their DUNN & BRADSTREET or FICO scores), length of time advertisers have been utilizing system, total money spent (i.e. over a specific time period and/or length of a contract) by advertisers, past match queries (i.e. frequency of, number/choices of ads/listings clicked on, time spent reviewing, number/types of ads/listings displayed), etc. Indeed, as can now be appreciated, the placement factors (weighted and/or unweighted)/rules possibilities may be virtually limitless.

Accordingly, no effort will be made here to attempt to list every possible set of weighted and/or unweighted factors and rules which may be implemented and utilized to determine advertiser/advertisement placement within seeker result lists. It is understood that numerous modifications and variations may be readily devised given the above and herein description of the principles of the invention. All such modifications and variations are well within the spirit and scope of this invention, as it is defined in the claims.

Also, though not preferred embodiments, result lists may contain only listings where, e.g., a minimum of one—or some/any other number of—criterion factors must match among/between the advertisers and/or the seekers (or where a certain number of particularly specified criteria factors must match up) in order to appear on a result list. Or, in still another embodiment, positional bidding could be conducted not exclusively between advertisers sharing the same criteria set; but instead be conducted between all advertisers who have one, two, three, four, etc; or at least one (or at least two, at least three, at least four, etc) criterion in common with each other, e.g., where each individual criterion an advertiser wanted to target could be bidded individually, then "algorithmically combined" (or combined in some other manner) to arrive at "current ranking" and "bid to become #1" figures:

Or, bidding could be conducted among all advertisers having at least a given advertiser's criteria factor set. Or, some "point value" methodology could be employed (with or without algorithms), where values are assigned to each criterion factor based on each factor's relative importance/value to the set of criteria as a whole or to some other existing and/or created benchmark (or even correlated to each [other] factor individually for value determination). In still another embodiment, the advertisers could be required to select some minimum number of criteria for their criteria set; and/or have some criteria cap on the number of criteria they may select. Or, their criteria set may be required to contain one or more particular rule-required criteria (i.e. one or more zip codes, an income range, familial size, marital status, etc). Indeed, as can now be appreciated, the competitive bidding possibilities may be virtually limitless.

Accordingly, no effort will be made here to attempt to list every possible set of bidding and other factors and rules which may be utilized to determine advertiser/advertisement placement within seeker result lists. It is understood that numerous modifications and variations may be readily devised given the above and herein description of the principles of the invention. All such modifications and variations are well within the spirit and scope of this invention, as it is defined in the claims.

Referring now again to FIG. 7, where the bid amounts among the paid advertisers are in monetarily ranked order; but not (excepting as between listings 710c and 710d) in "monetarily tight" sequential order. That is, though listed from highest bid to lowest based strictly on bid amounts as is the preferred embodiment, the actual amounts between each listings' bids are neither $0.01 nor some other system-operator-required monetary distance apart. GM is in first position with a $7.00 bid, yet, while Toys R Us is in $2^{nd}$ position, their bid is not even $6.80+. The differences between 750b and 750c, and between 750f and 750g, are greater still. This is what result lists will typically look like in a preferred embodiment of the present invention, where each advertiser simply bids only against other advertisers targeting the same exact criteria set as they are not against other criteria sets, e.g., all advertisers sharing at least one common criterion but no conflicting criteria (which embodiment, while possible to implement, would be unwieldy, complicated and difficult to manage given the large number of variables involved). The advertisers chose their bid amounts based on what positions they desired for their own selected criteria set. Though irrelevant to the operation of the system; note that, over time, especially as the system's utilization expands beyond 100,000+ advertiser/providers, these monetary variations between positions on result lists will generally narrow.

Let us now take a look at how, working from the previously detailed result list placement rules, the six paid listings of FIG. 7 may have come to be listed in the order depicted (establishing scenarios so as to determine exactly why they are listed so would limit the exploration of multiple aspects of the above rules and the present invention and is therefore not pertinent to our discussion here):

First; we know that all the listed advertisers have at least one criterion factor in common with the seeker while having no criterion factors which conflict with/contradict those of the seekers. Accordingly, one or more of these advertisers' criteria sets could, for example, consist entirely of any one of seeker's criterion factors, e.g., just "females," just "age 37" (or "35-40" etc), just "those with $50,000-$74,999 total household income," etc. Or two criterion factors, e.g. "female"+"35-40," "CA resident+enjoys sports," "female+enjoys sports," etc. Or three factors, etc; up to this seekers total of six criteria factors. In effect, each individual advertiser's criteria set may consist of any number of, in any combination, of this seeker's total criteria set (or more, as explained below), as depicted, consisting of: Female, age 37, $50,000-$74,999 THI, minor children in household, CA resident, and enjoys sports.

Contradicting criteria (which negate the listing of otherwise qualified-to-be-listed-advertisers in a result list for a given seeker) are those criteria which, by their nature, eliminate or "cancel out" one or more of the unique demographic, geographic, and/or psychographic factors unique to each seeker. Contradicting criteria, in effect, render meaningless these unique criteria factors. Using our example seeker for illustration; contradicting criteria would include if the seeker were male, any age but age 37 (or any age range which does not include 37), had any total household income besides $50,000-$74,999, had no minor children in household, was a resident of any state other than California, and who dislikes sports.

This means that, even if an advertiser's criteria set included female, age 37, $50 k-$74,999 THI, and CA resident (5 of the seeker's 6 criteria); but which also included those women who dislike sports; this advertiser's listing would not be included in this seeker's result list. "Dislikes Sports" contradicts "Likes Sports." The seeker probably doesn't want to see listings targeted to women like her but who don't like sports anyway; and in any case, this advertiser has already indicated they want to reach only such women who do not like sports. They've already said, by their choice of criteria, that they want to target—and only pay for—those 37 year old women with $50 k-$74,999 THI having minor children in the household who live in California who dislike sports. Not those who like sports. In a similar manner; an advertiser who is targeting age 37, CA resident, enjoys sports, Males would also not appear on this seeker's list, as a result of the contradicting criterion "Male." Nor would an advertiser appear whose set includes female, age 37, minor children in household, enjoys sports; but where the household income is a contradicting $75,000.

Now, if any of these displayed advertisers' criteria sets had consisted of from one to six of this seeker's criteria factors plus one or more additional criterion factors (conflicting or not), under our operating rules, their listing would not have appeared; due to advertisers desire for greater specificity and/or different (though similar) targeting. Therefore, if one or more of the six paid advertisers' criteria sets had consisted of one or more from the set of female, age 37, $50 k-$74,999 THI, minor children in household, CA resident, and enjoys sports but also included, e.g. "was in the military," "enjoys reading," "enjoys horseback riding," "has asthma," "wants to buy a computer," "has a dog," etc, their listing would not have appeared. Because the advertiser(s) wouldn't be getting (all) what they were looking for in such a scenario, they don't have to (and wouldn't want to anyway) pay for a listing to be presented to this particular seeker.

Now specifically (looking again to FIG. 7); perhaps General Motors is targeting (and so their criteria set therefore consists of) just females. Or females who live in California. 37 year old females who enjoy sports. Females with minor children in the household. Maybe they're looking for 37 year old CA females with minor children. Or 37 year old CA residents who enjoy sports (note here that, by GM indicating their offer is for men OR women [by not making "females" one of their chosen criteria], their listing will appear for both women and men who live in CA, are 37 years old, and who like sports). In all these scenarios, GM would appear on the FIG. 7 seeker's result list. If, however, GM specified "Males" as part of any of these otherwise "qualified" criteria sets; because such criteria would then contradict seeker's, their listing would not appear for this female seeker.

In the event GM's criteria set included from one to all six of the same six criteria as this seeker plus one or more additional criteria, e.g. "Regularly uses their American Express Card," "Listens to Music," "Has a Dog" etc; because GM is more specific (and targeting differently if less than six of their criteria matches seeker) in its targeting than is seeker, seeker would not see this GM listing. GM wants in this case to be more targeted/specific than seeker is; making this seeker "ineligible" to know about GM's listing/offer. As this illustrates, in many cases it may be in the advertisers best interest to specify just the minimum number of targeting criteria as is truly consistent with their offer/listing/company in order to maximize the number of likely customers/clients for their products, services, and benefits. With this system's pinpoint targeting accuracy, it would be easy to get carried away by selecting more criteria than is really required; resulting in unnecessary lost business.

Why is GM in the first/top position in this seeker's list? Under our rules, it's not because they've bid the most to be so; but because GM has the highest bid amount of all the paid advertisers who qualified to be displayed to this particular seeker. What GM's top position additionally tells us is that they also hold the top position among those advertisers targeting the same (and therefore who are "competing" with GM) criteria set as GM is. This is so because, since GM's criteria set got them on this seeker's list, all other advertisers sharing the same set as GM must by logic and necessity also appear in this seeker's list, since, if GM "matches up" with this seeker, everyone sharing GM's criteria set also "matches up" with this seeker. What we can't tell from this list, though, is just what GM's criteria set is; as it could be any type and number of criteria which qualifies the seeker to view GM's listing under our rules. Such targeting secrecy (and click fraud reducing) is obviously very valuable and desirable to advertisers; and is another of the many unique features and benefits of the present invention.

The remaining five paid advertisers of FIG. 7 are in the order they are, as with GM, only because of the bid amounts they are paying for whatever positions each of them have selected in competition with other advertisers targeting the exact same respective criteria set as each of these five are. What we can discern, however (given that most seekers will have result lists totaling some 100+ listings once system has been in operation for a short while), is that all five hold very high places among their specific, respective criteria set in order to show up in the top six paid positions on this list. Indeed, given the amazingly wide range of available criteria sets for advertisers to choose from, there is a good chance that each of these advertisers may actually hold the top position among all companies competing for each advertisers respective targeted criteria sets; just as we have determined GM is with their criteria set. Additionally, each of these six advertisers (though they all have at least one non-contradictory criterion factor in common with the seeker), may have no criterion factors in common with each other.

For example, GM could be targeting just females with their 0% financing offer. Toys R Us, only 37 year olds (and so, males or females) for their offer, Amazon, just those with THI's of $50,000-$74,999 for theirs. 24 Hour Fitness, only CA residents. PCH, just those with minor children in the household. RealtyTruth.com, only those who enjoy sports. No criteria in common with each other; yet all would appear on this seeker's result list under the rules of this embodiment. All these advertisers able to reach their targets—and only their targets, no matter what criteria each advertiser selects. And with no one the wiser about what any of them are doing or the markets they're each targeting. That's the profound versatility of the present invention.

Unpaid listing 710e is displayed among the paid listings. Preferably, such unpaid listings—especially those offering high-demand free or very low cost products, services, and benefits such as is often the case with government programs and the like—may be interspersed among the paid listings. In this way, seekers remain highly motivated to review the complete list of all offered products, services, and benefits offered by all the advertisers. "Free" has proven itself over the years to be one of the most powerful words in advertising/marketing. Interspersing such listings among the paid listings therefore puts "Free" to its best use; for the benefit of all; seekers, advertiser/providers, and the system operator/administrator. It is to be understood that the displayed PSB listings are in no way limited to any particular type or number of listings.

In a preferred embodiment, hyperlink 770 of FIG. 7 provides seekers with the option to have their profile data saved by the system operator so they won't have to complete the questionnaire(s) again in order to generate the highly-desired updated result lists in the future. Preferably, they are also given the option to receive automatically (or manually) generated result lists at regular time intervals of their (or optionally system operator's) choosing. Given the dynamic, constantly-changing (e.g., often time-sensitive and availability/supply limited) nature of both "everyday" as well as government product, service, and benefit offerings; when combined with the pinpoint targeting/matching of entities with the advertisers offerings as provided by the present invention, such entity-requested updated and accurate-to-the-minute result lists will likely be desired no less than at least daily by these anxious—and curious—entities. Daily review and consideration of "who's offering me/us/my company/my city what; when; and for how long" will one day be as ubiquitous as the morning newspaper or cup of coffee. While such data storage and automated updating methodologies are well know to the arts; the architecture for and procedures to implement this data storage and automated updating are not conventional in the bidded-position, pay-for-performance system of matching providers with seekers as detailed herein.

Though shown in FIG. 7 for clarity and explanatory purposes, the preferred embodiment is that the advertisers' bid amounts not be shown. Unlike as is the case with the Internet search field/industry, where questions have been regularly raised as to how the order of search results are determined (especially so in the early years of search); the current invention has no such editorial integrity issues. Seekers know what's "going on," what to expect, and what the match result lists are revealing to them. Other media doesn't display what advertisers have paid for their placements; it preferably shouldn't be done with the present invention, either.

Also preferably, if two PSB listings with the same criteria sets also have the same bid amount, the bid that was received earlier in time will be assigned the higher rank value. Alternatively, a minimum monetary bid increment "distance" ($0.01, $0.05, etc) between bids to eliminate ties from occurring may optionally be required.

It is to be understood that while presenting results lists to seekers whereby the paid advertisers are listed strictly in highest-to-lowest descending order based on their respective criteria-set bids is the preferred embodiment (and, as stated, optionally yet preferably with unpaid listings being interspersed among the paid listings); in an alternative embodiment, they may be listed and displayed in any order deemed suitable by the system operator, as long as the advertisers' bids are at least one of the factors in the determination of the order in which the advertisers appear in results lists.

In another embodiment, the PSB listings may be categorized and presented to the seeker in a "segmented-by-subject-matter" manner, e.g., under one or more categories/classes and/or sub categories/sub classes such as "Housing," "Employment," "Education," "Vacation/Recreation," "Government," etc. In a preferred embodiment of this option (ideally, subject to editorial review in order to insure relevancy) the categories in which their PSB listings/offerings are to appear may be self-selected by the advertisers themselves (preferably via account management menu 170 of FIG. 2). Alternatively, the system administrator may itself categorize the listings in this or a related manner; manually or automatically. In the event such categorization is utilized, the preferred embodiment is that, to the greatest extent possible in order to maintain the relative "positional/monetary strength" of and between the advertisers, rankings and listing positions change no more than is necessary when instituting such categorization e.g., with the advertisers continuing to be listed in descending order; highest bid at the top, lowest at the bottom. Such categorization may make it easier for some entity PSB seekers to review the products, services, and benefits being offered to them by the providers/advertisers; particularly as, once launched, the inventions use continues its rapid expansion in the years to come. Alternatively, any and all other various types and forms of results ordering/positioning and presentation to seekers are also well within the scope of the present invention; including, as above, the option of having the listing order of the advertisers not be based solely on the advertisers' bid amounts.

Figure 8:
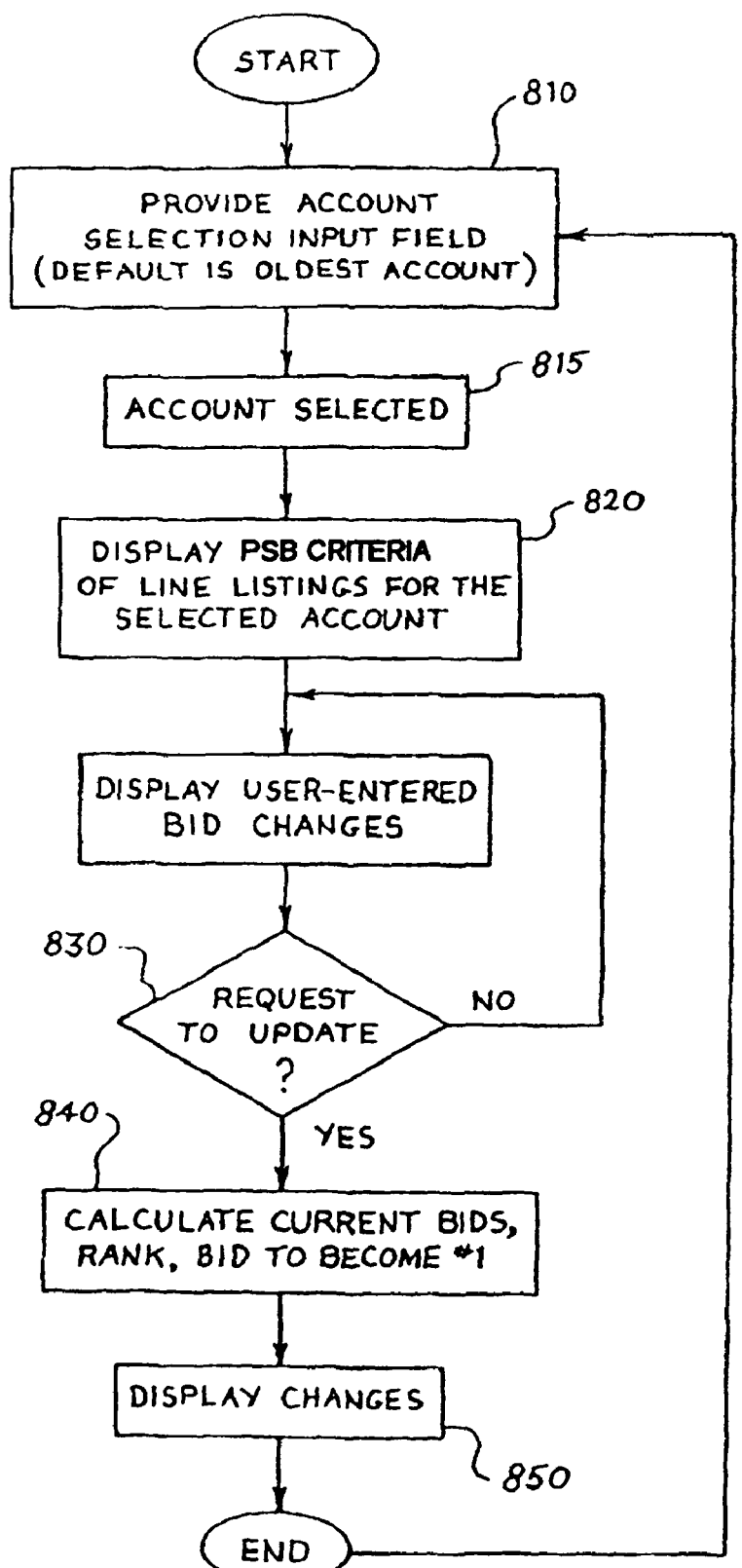
FIG. 8 is a flow chart illustrating a change bids process used in one embodiment of the present invention.

As shown in the campaign management menu 170 of FIG. 2, several choices are presented to the advertiser to manage PSB criteria. First, in the "Change Bids" selection, the advertiser may change the bid of PSB criteria currently in the account. The process invoked by the system for the change bids function is shown in FIG. 8. After the advertiser indicates the intent to change bids by selecting the "Change Bids" menu option, the system searches the user's account in the database and displays the PSB criteria(s) for the entire account or a default subaccount in the advertiser's account, as shown in step 810. PSB criteria may be grouped into subaccounts defined by the advertiser and may comprise one or more PSB criteria. Only one subaccount may be displayed at a time. The display should also preferably permit the advertiser to change the subaccount selected, as shown in step 815. The screen display will then show the PSB criteria for the selected subaccount, as indicated in step 820.

An example of screen display shown to the advertiser in step 810 is shown in FIG. 9 and will be discussed below. To change bids, the advertiser user may specify new bids for PSB criteria for which the advertiser already has an existing bid by entering a new bid amount into the new bid input field for the PSB criteria. The advertiser-entered bid changes are displayed to the advertiser at step 820 of FIG. 8 as discussed above. To update the bids for the display page, the advertiser requests, at step 830 of FIG. 8, to update the result of changes. The advertiser may transmit such a request to the account management server by a variety of means, including clicking on a button graphic.

As shown in step 840 of FIG. 8, upon receiving the request to update the advertiser's bids, the system calculates the new current bid amounts for every PSB criteria displayed, the rank values, and the bid amount needed to become, preferably, the highest ranked PSB listing matching the PSB criteria field (optionally, the bid amount[s] needed to become the $n^{th}$ ranked PSB listing may [also] be provided to and selected by the advertiser e.g., $3^{rd}$ highest, $5^{th}$ highest, $10^{th}$ highest, $25^{th}$ highest, etc). Preferably, the system then presents a display of changes at step 850. After the user confirms the changes, the system updates the persistent state by writing the changes to the account in the database.

The PSB criteria data is displayed in tabular format, with each PSB criteria set corresponding to one row of the table 900. The PSB criteria 902 is displayed in the leftmost column, followed by the current bid amount 904, and the current rank 905 of the PSB criteria. The current rank is followed by a column entitled "Bid to become #1" 906, defined as the bid amount needed to become the highest ranked for the displayed PSB criteria set; and "New Bid" column 907. This rightmost column 907 of each row comprises one or more new bid input fields 908 which is set initially to the current bid amount.

As shown in FIG. 9, the PSB criteria listings may be displayed as "subaccounts." Each subaccount comprises one PSB criteria set/group, with multiple subaccounts residing within one advertiser account as needed. Each subaccount may be displayed on a separate display page having a separate page. The advertiser should preferably be able to change the subaccount being displayed by manipulating a pull-down menu 910 on the display shown in FIG. 9. In addition, PSB criteria sets that cannot be displayed completely in one page may be separated into pages which may be individually viewed by manipulating pull-down menu 920. Again, the advertiser should preferably be able to change the page displayed by clicking directly on a pull-down menu 920 located on the display page of FIG. 9. The advertiser may specify a new bid for a displayed PSB criteria set by entering a new bid amount into the new bid input field 908 for the PSB criteria set. To update the result of the advertiser-entered changes, the advertiser clicks on button graphic 912 to transmit an update request to the account management server, which updates the bids as described above.

Many of the other selections listed in the "Account Management" menu 170 of FIG. 2 function as variants of the "Change Bid" function described above. For example, if the advertiser selects the "Change Rank Position" option, the advertiser may be presented with a display similar to the display of FIG. 9 used in the "Change Bid" function. However, in the "Change Rank Position" option, the "New Bid" field 907 would be replaced by a "New Rank" field, in which the advertiser enters the new desired rank position for a PSB criteria. After the advertiser requests that the ranks be updated, the system then calculates a new bid price by any of a variety of algorithms easily available to one skilled in the art. For example, the system may invoke a routine to locate the PSB criteria in the match engine database having the desired rank/PSB criteria combination, retrieve the associated bid amount of said combination, and then calculate a bid amount that is N cents higher; where N=1, for example. After the system calculates the new bid price and presents a read-only confirmation display to the advertiser, the system updates the bid prices and rank values upon receiving approval from the advertiser.

The "Modify Listing Component" selection on Account Management menu 170 of FIG. 2 may also generate a display similar to the format of FIG. 9. When the advertiser selects the "Modify Listing Component" option, the advertiser may input changes to the URL, title, or description of a PSB criteria via web-based forms set up for each PSB criteria. Similar to the process discussed above, the forms for the URL, title, and description fields may initially contain the old URL, title and description as default values. After the advertiser enters the desired changes, the advertiser may transmit a request to the system to update the changes. The system then displays a read-only confirmation screen, and then writes the changes to the persistent state (e.g., the user account database) after the advertiser approves the changes.

A process similar to those discussed above may be implemented for changing any other peripheral options related to PSB listing; for example, changing the matching options related to bidded PSB criteria. Any recalculations of bids or ranks required by the changes may also be determined in a manner similar to the processes discussed above.

In the "Delete Bidded PSB Criteria Term" option, the system retrieves all of the PSB listings in the account of the advertiser and displays the PSB listings in an organization and a format, similar to the display of FIG. 9. Each PSB criteria entry may include, instead of the new bid field, a check box for the advertiser to click on. The advertiser would then click to place a check (X) mark next to each PSB criteria to be deleted, although any other means known in the art for selecting one or more items from a list on a web page may be used. After the advertiser selects all the PSB criteria to be deleted and requests that the system update the changes, the system preferably presents a read-only confirmation of the requested changes, and updates the advertiser's account only after the advertiser approves the changes. The "deleted" PSB criteria is/are removed from the match engine, database 36 and will not appear in subsequent match requests. However, the PSB criteria will remain as part of the advertiser's account record for billing and account activity monitoring purposes.

In the "Add Bidded PSB Criteria" option, the system provides the advertiser with a display having a number of entry fields corresponding to the elements of PSB criteria. The advertiser then enters into each field information corresponding to the respective PSB listing element, including the PSB criteria, the web site URL, the web site title, the web site description, and the bid amount, as well as any other relevant information. After the advertiser has completed entering the data and has indicated thus to the system, the system returns a read-only confirmation screen to the advertiser. The system then creates a new PSB listing instance and writes it into the account database and the match engine database upon receiving approval from the advertiser.

Preferably, the "Account Management" menu 170 of FIG. 2 provides a selection for the advertiser to "Get Suggestions On Bidded PSB Criteria". In this case, the advertiser enters (a) bidded PSB criteria into a form-driven query box (or other known means for selecting one or more from a given set of choices) displayed to the advertiser. The system reads the PSB criteria entered by the advertiser and generates a list of additional related PSB criteria to assist the advertiser in locating criteria relevant to the content of the advertiser's web site and/or offerings. Preferably, the additional criteria are generated using methods such as a string matching algorithm applied to a database of bidded criteria and/or a thesaurus database implemented in software. The advertiser may select criteria to bid on from the list generated by the system. In that case, the system displays to the advertisers the entry fields described above for the "Add Bidded PSB Criteria" selection, with a form for entering a PSB listing for each criterion/criteria (set) selected. Preferably, the selected criteria is inserted as a default value into the form for each PSB listing. Default values for the other PSB listing components may also be inserted into the forms if desired.

The "Account Management" menu 170 of FIG. 2 also preferably provides advertisers with a "Project Expenses" selection. In this selection, the advertiser specifies a PSB listing or subaccount for which the advertiser would like to predict a "daily run rate" and "days remaining to expiration." The system calculates the projections based on a cost projection algorithm, and displays the predictions to the advertiser on a read-only screen. The predictions may be calculated using a number of different algorithms known in the art. However, since the cost of a PSB listing is calculated by multiplying the bid amount by the total number of clicks received by the PSB listing at that bid amount during a specified time period, every cost projection algorithm must generally determine an estimated number of clicks per month (or other specified time period) for a PSB listing. The clicks on a PSB listing may be tracked via implementation of a software counting mechanism as is well known in the art. Clicks for all PSB listings may be tracked over time, this data may be used to generate estimated numbers of clicks per month overall, and for individual PSB criteria. For a particular criteria, an estimated number of match requests per day is determined and is multiplied by the cost of a click. This product is then multiplied by a ratio of the average number of clicks over the average number of impressions for the rank of the PSB listing in question to obtain a daily run rate. The current balance may be divided by the daily run rate to obtain a projected number of days to exhaustion or "expiration" of account funds.

One embodiment of the present invention bases the cost projection algorithm on a simple predictor model that assumes that every PSB criteria performs in a similar fashion. This model assumes that the rank of the advertiser's PSB listing will remain constant and not fluctuate throughout the month. This algorithm has the advantages of being simple to implement and fast to calculate. The predictor model is based on the fact that the click through rate, e.g. the total number of clicks, or referrals, for a particular PSB listing, is considered to be a function of the rank of the PSB listing. The model therefore assumes that the usage curve of each PSB criteria, that is, the curve that results when the number of clicks on a PSB listing is plotted against the rank of the PSB listing, is similar to the usage curve for all PSB criteria. Thus, known values extrapolated over time for the sum of all clicks for all criteria, the sum of all clicks at a given rank for all criteria, and the sum of all clicks for the selected criteria may be employed in a simple proportion to determine the total of all clicks for the given rank for the selected criteria. The estimated daily total of all clicks for the selected criteria at the selected rank is then multiplied by the advertiser's current bid amount for the criteria at that rank to determine a daily expense projection. In addition, if particular criteria or classes of criteria are known to differ markedly from the general pattern, correction values specific to the criteria, advertiser, or other parameter may be introduced to fine-tune the projected cost estimate.

Finally, the "Account Management" menu 170 of FIG. 2 provides several selections to view information related to the advertiser's campaigns. The "View Subaccount Information" selection displays read-only information related to the selected subaccount. The "View PSB Criteria List" selection displays the list of the advertiser's selected criteria along with the corresponding URLs, bid price, and rank, with the criteria preferably grouped by subaccount. The advertiser may also view current top bids for a set of criteria selected from a list of criteria from a read-only display generated by the system upon receiving the requested criteria from the advertiser.

For an advertiser who requires a more comprehensive report of PSB listing activity, the "View Report" option may be selected from the Advertiser Main Page 120 of FIG. 2. In an embodiment of the present invention, the "View Report" options generate reports comprehensive for up to one year preceding the current date. For example, daily reports are available for the each of the immediately preceding 7 days, weekly reports for the preceding four weeks, monthly reports for the preceding twelve months, and quarterly reports for the last four quarters. Additional reports may also be made available depending on advertiser interest.

Other predefined report types may include activity tracked during the following time periods. Since Inception of the Account, Year To Date, Yearly, Quarter To Date, Month To Date, and Week to Date. Report Categories may include a Detail Report, viewable by Advertiser Account, by PSB Criteria, and by URL, and a Summary Report, viewable by Advertiser Account and by Subaccount. The reports may include identification data such as advertiser account and subaccount name, the dates covered by the report and the type of report. In addition, the reports may include key PSB listing account data such as current balance, pending current balance, average daily account debit, and run rate.

Furthermore, the reports may also include key data, such as: PSB criteria, URLs, bids, current ranks, and number of clicks, number of match requests done for the PSB criteria, number of impressions (times that the PSB listing appeared in a PSB match result list), and click through rate (defined as Number of Clicks/Number of Impressions). Preferably, the report is available in at least HTML view options for viewing via a browser program, printing, or downloading. Note, however, that other view options may be made available, such as Adobe Acrobat, PostScript, ASCII text, spreadsheet interchange formats (e.g., CSV, tab-delimited), and other well-known formats.

When the advertiser has selected the "View Report" option, the system invokes a function which displays a list of available report types, dates, categories, and view options. The system preferably creates a report instance with the following fields, all of which are initially set to null: report type, report date, report category, and view option. Once the advertiser has defined the parameters described above, the system invokes a function to generate the requested report, based on the advertiser-set parameters, and to display the report, based on the view option parameter.

Finally, a preferred embodiment of the present invention implements an option for context specific help that the advertiser may request at any time the advertiser is logged in. The help option may be implemented as a small icon or button located on the system generated display page. The advertiser may click on the icon or button graphic on the display page to request help, upon which the system generates and displays a help page keyed to the function of the particular display the user is viewing. The help may be implemented as separate display pages, a searchable index, dialog boxes, or by any other methods well known in the art.

Given the above description of an overall approach to the Match Engine Marketing (Paid Match) service of the present invention, specific non-claim-limiting examples of different criteria (characteristics) bid sets by various potential advertiser/providers will now be described:

Example I

General Motors decides to test a special financing program ONLY to everyone who currently owns a non-GM automobile AND who lives in Florida AND who has minor children at home AND who is 18-49 years old AND lives within 20 miles of one of their Florida dealerships. This criteria set costs them only $7 for the top position, for each of their clicks/referrals; a bargain considering their average lead cost for their dealer network runs almost $80. Because they were able to pinpoint target their offer in this way, the millions of other existing (and potential) GM customers weren't upset that they weren't offered the same special financing this group was. As a result of how other marketing/media options operate, until now, this "non-targeted market awareness" and resultant anger and disappointment was often a big headache for GM. Not anymore.

Example II

Sees Candy geographically pin-point offers a buy-one-get-one-free coupon only to people living in those four zip codes closest to each of their 432 stores AND who haven't bought Sees candy in the last 12 months. They pay just $3.55 (for criteria set position number five) for each click/lead. Since only two boxes of candy pays for both the lead and the coupon; given the excellent repeat and word-of-mouth sales new customers generate, this is the most affordable advertising they've ever done.

Example III

Publisher's Clearing House is looking for a new way to bring in subscribers for their 100+ magazine and product suppliers and decides to use the system for an A/B split test; something they're well familiar with. To do so, they divide up the 40,000 national zip codes in half (on an "every other one" basis to insure result accuracy), making two different offers to each of the two sets of recipients. Paying only $2.68 (list position #13) per click/lead, they discover to their amazement that their ROI is almost three times that of direct mail.

Example IV

Amazon.com decides to take their 25 top selling $50-$200 non-book products and tailor a criteria set unique to each product, based on the profile of those most likely to have bought each product in the past. The results? Paying just $3.10/click/lead for a positional average of five over all the products; their national advertising cost of sale is running 44-76% (depending on product) less than any other media they've ever used before.

Example V

Tiffany has designed an exclusive new line of high-end ($25,000+/piece) jewelry they want to sell over the Internet and by phone to those not living within driving distance of one of their stores; yet are tired of all the logistical difficulties of placing ads in overpriced, multi-month lead times, hard-to-measure-results, hit-or-miss magazines. Instead, they pay only $9.72 for the #1 spot with the following criteria: Household income of $100,000+ AND have high-speed Internet access at home or work AND already own at least $50,000 in jewelry AND have a net worth of at least $500,000 excluding their principle residence. The result? Though it's early in the campaign, their cost of sale is averaging less than a third of what they usually spend—just $3,500 per piece. While this amount may sound high, given that these pieces average a whopping 100% markup (as is common in the industry), it's actually almost like printing money.

Example VI

A small, local company, Wonderful Weddings, only provides their services to those in the Thousand Oaks, Westlake Village, and Agoura areas. Accordingly, they select the following criteria: Zip Codes 91359, 91360, 91361, 91362, and 91301+ Females (men rarely make wedding decisions, so why pay to reach them?)+Getting married within the next six months (how many newspaper readers does this attribute ever apply to?). Since they average $15,000 in products and services sold per wedding, they're only too happy to be paying $2.97/click/lead (criteria set position 7) to reach only their target market.

Example VII

AT&T is launching an exciting new DSL service to the business community and wants to move quickly before their tough competitors get wind of it. As a test, they initially target every 10th zip code (an $N^{th}$ sort); giving them 4000 zip codes worth of businesses at a B2B cost of just $8.32 per click/lead (since they want to reach all businesses regardless of employee count, revenue, facilities location(s), industry sector, products/services offered, etc, they've decided to not use any other firmographic criteria on this offer). This buys them the top position. They realize within the first 15 days that this new (avg. $1,000+/year/business) service is their biggest winner yet, and so immediately roll their offer out to all 40,000 US zip codes; now paying $8.57 per click/lead. By the time their competitors get hold of the offer and try to come up with something to counter AT&T, it's already too late. SBC, Verizon, Southwest Bell, and the rest never knew what hit them.

As these are just a few examples of the virtually limitless use possibilities for the present invention, it is to be understood that these Examples are of course not intended to, and should accordingly not be used to, either limit the scope of the claims or to limit the invention to either any particular embodiment(s) or to (a) precise form(s).

CONCLUSION

While the invention has been described in connection with what is presently considered to be the most practical and preferred embodiment, it is to be understood that the invention is not to be limited to the disclosed embodiment. This description is not intended to be exhaustive or to limit the invention to the precise form disclosed.

As should now be readily apparent, the unobvious and unexpected, superior results present invention clearly and convincingly takes the matching of advertisers with their entity targets to a whole new and exciting, powerfully effective, highly profitable and premier level by providing the world's first and only real or substantially real time pay for performance characteristics-targeted marketing vehicle. As the ground-breaking GoTo patent (U.S. Pat. No. 6,269,361) did for its new "paid search" industry; the present invention is itself the foundational force set to lead the way to another exciting new national and international industry. Welcome to the birth of revolutionary new frictionless advertising, to be heretofore known as Match Engine Marketing™/Paid Match™.

The many features and advantages of the groundbreaking present invention are apparent from the detailed, clarity-and-understanding-providing specification. Furthermore, since numerous modifications, variations, changes, and alterations will readily occur to those skilled in the arts once this invention is known to the arts, it is not desired that the present invention be limited to the exact constructions, operations, and implementations illustrated and described herein; and accordingly, all suitable modifications, variations, and equivalents which may be resorted to are intended to fall within the true spirit, concept, and scope of the invention and its claims and their legal equivalents; including where any bidding on, and/or payment(s) based on, entity criteria/characteristics is resorted to.

What is claimed is:

1. A method of generating a product/service/benefit result list in response to a match request from a PSB seeker using in whole or in part a computer-compatible network, comprising:
    maintaining a database including a plurality of PSB listings, wherein each PSB listing is associated with a PSB provider, at least one PSB criteria factor, and a modifiable bid amount that is independent of other components of the PSB listing, the bid amount being associated with at least one of the PSB and the PSB provider, the bid amount corresponding to a money amount that is deducted from an account of a PSB provider associated with the PSB upon receipt of a request of at least one of information about the PSB provider or the PSB itself;
    receiving a PSB match request, which includes seeker criteria information, from the PSB seeker;
    identifying the PSB listings having PSB criteria which generate a match with the PSB match request;
    ordering the identified PSB listings into a PSB result list in accordance with the values of the respective bid amounts for the identified PSB listings;
    receiving a retrieval request from the PSB seeker to retrieve information associated with a PSB listing in the result list;
    recording a retrieval request event including account identification information corresponding to the PSB provider, to permit maintenance of accurate account records.

2. The method of claim 1, further comprising the step of updating a listing in the listing database in response to a request from a provider.

3. The method of claim 1, further comprising the step of including on the result list one or more listings having no bid or zero bid amount.

4. The method of claim 3, wherein said listings include one or more search result listings.

5. The method of claim 1, wherein the account database comprises at least one account record for each of a plurality of providers, said account record including at least one listing having listing criteria and a bid amount,
an account balance; and
a unique account identifier.

6. The method of claim 5, wherein the listings in the account record are organized into at least one subaccount within the account record.

7. The method of claim 5, further comprising the step of including on the result list one or more listings having no or zero bid amount.

8. The method of claim 5, wherein the retrieval request event comprises the criteria and the bid amount of the listing, and an account identifier associated with the listing.

9. The method of claim 8, wherein the retrieval request event further includes a rank value.

10. The method of claim 8, wherein the retrieval request event is linked to the account record having an account identifier that corresponds to the account identifier listed on the retrieval request event.

11. The method of claim 10, wherein the bid amount of the retrieval request event is charged to the account balance of the account record having an account identifier that matches the account identifier of the retrieval request event.

12. A method of generating an advertising presentation using at least in part a computer-compatible network, comprising:
    maintaining a database including a plurality of advertisements, wherein each advertisement is associated with a provider and a modifiable bid amount that is independent of other component(s) of the advertisement, each advertisement being searchable;
    identifying the advertisement(s) having demographic and/or psychographic and/or firmographic criteria which generate at least a partial match with an entity;
    arranging the identified advertisement(s) into said advertising presentation at least in part in accordance with the values of the respective bid amounts for the identified advertisement(s).

13. The method of claim 12, wherein the estimated cost of an advertisement for a specified time period is calculated as a product of at least the current bid amount of the advertisement and a projected number of times the advertisement is expected to be viewed and/or selected by an entity within a specified time period.

14. A method of generating a result list in response to a match request from a seeker using a computer network, comprising:
    maintaining a database including a plurality of listings, wherein each listing is associated with criteria and a modifiable bid amount that is independent of other components of the listing;
    receiving a match request from the seeker;
    identifying the listings having criteria which generates a match with the match request;
    ordering the identified listings into a result list in accordance with the values of the respective bid amounts for the identified listings;
    receiving a retrieval request from the seeker to retrieve information associated with a listing in the result list;
    generating a listing activity report including information on retrieval requests received from seekers.

15. An apparatus having stored thereon at least:
    at least one database having at least one account record for each of a plurality of advertising providers, the account record including:
    at least one listing corresponding to at least one criteria, a modifiable bid amount that is independent of other components of the listing, a locator corresponding to the address/location of a document residing on a network server, a description, and a title;
an account balance;
a history of listings included in the advertising provider's account record;
payment processing information, wherein said payment processing information is accessible to a network and isolated from public access; and
a payment history;
programming code for providing the advertising provider with login access in response to authentication, wherein the advertising provider's login access grants the advertising provider access to modify the advertising provider's account, the advertising provider not being provided with access to modify the accounts of others;
programming code for adding money to the account of an advertising provider upon receiving a request from said advertising provider;
programming code for adding a listing to an account of an advertising provider upon receiving a request from said advertising provider;
programming code for deleting a listing to an account of an advertising provider upon receiving a request from said advertising provider;
programming code for modifying the listing of an advertising provider upon receiving a request from said advertising provider;
programming code for generating an activity report for an advertising provider upon receiving a request from said advertising provider;
programming code for receiving a match request from a device, the request including at least one criteria, the request being received from a device;
programming code for generating a result list in response to the match request, the result list including listings from the accounts on the database, wherein the criteria for each listing in the result list generates a match with the match request, the listings in the result list arranged in an order determined at least in part by using the bid amounts of the listings.

16. The apparatus of claim 15, additionally comprising: programming code for said criteria to consist of at least one of the following: age, gender, income, marital status, occupation, familial size, familial composition, one or more health or medical conditions or diseases, one or more hobbies, education, housing status, one or more health or medical conditions or diseases, employee count, industry type/category, revenue, number of locations/branches, sales volume, size, time length in business, profits, losses, market share, legal structure, student count, student composition, college degrees offered, population.

17. The apparatus of claim 15, additionally comprising: programming code for said criteria to consist of at least five of the following: age, gender, income, marital status, occupation, familial size, familial composition, education, housing status, one or more health or medical conditions or diseases, one or more hobbies, employee count, industry type/category, revenue, number of locations/branches, sales volume, size, time length in business, profits, losses, market share, legal structure, student count, student composition, college degrees offered, population.

18. The apparatus of claim 15, additionally comprising programming code for said criteria to include at least five criteria.

19. The apparatus of claim 15, additionally comprising programming code for including one or more search result listings with the match result list.

20. The apparatus of claim 19, additionally comprising programming code for presenting said search result listings anywhere in relation to said PSB result list; including one or more of before, after, amongst; above, and/or below and/or to either side of said PSB result list.

21. A method of enabling a provider to update information relating to a listing on a result list generated by a matching engine, comprising the steps of:
maintaining an account database having at least one account record for each of a plurality of providers, said account record including
at least one listing having criteria and a modifiable bid amount that is independent of the other components of the listing; and
an account identifier;
receiving from a provider a change request for a listing in the provider's account;
updating the listing in the provider's account record in response to the change request;
determining a position for the updated listing in a result list generated by the matching engine in response to a criteria information included match request received from a seeker using the matching engine, where the criteria of the updated listing generates a match with the match request and the position of the updated listing in the result list is determined at least in part by using the bid amount.

22. The method of claim 21, wherein the criteria of each listing in the result list generates a match with the match request.

23. The method of claim 22, wherein the listings in the result list are sorted in order of decreasing bid amount.

24. The method of claim 23, further comprising the step of assigning an ordinal rank value to each listing in the result list in order of decreasing bid amount, with the smallest rank value assigned to the listing in the result list having the highest bid amount, and the largest rank value assigned to the listing having the lowest bid amount.

25. The method of claim 23, further comprising the steps of determining creation time value for each listing in the account database;
identifying listings within a result list having equivalent bid amounts; and
within a group of listings within a result list that have equivalent bid amounts, sorting the listings in order from earliest to most recent creation time value.

26. The method of claim 21, wherein the account record further includes an account balance.

27. The method of claim 26, wherein the account balance is positive.

28. The method of claim 26, further comprising the step of subtracting the bid amount from the account balance when a listing is selected by the seeker from the result list.

29. The method of claim 26, where the listing further comprises a web site title, a web site description, and a web site Uniform Resource Locator (URL).

30. The method of claim 29, further comprising the step of recording a retrieval request event when a listing is selected by a seeker from the result list.

31. The method of claim 30, wherein the retrieval request event comprises an account identifier, and a bid amount.

32. The method of claim 31, wherein the retrieval request event further comprises at least one from the group of:
a criteria
a web site URL
a rank value.

33. The method of claim 31, further comprising the step of applying a charge to an account balance, where the charge corresponds to a bid amount recorded in a retrieval request event having an account identifier that matches the account identifier corresponding to the account balance.

34. A method of enabling a provider using a computer-compatible network to update information relating to a listing within a result list generated by a match engine in response to a match request received from a remote device over the computer-compatible network, comprising the steps of:
maintaining an account database having at least one account record for each of a plurality of providers of the computer-compatible network, said account record including an account identifier, and at least one listing having criteria and a modifiable bid amount that is independent of other components of the listing;
providing the provider with authenticated login access, wherein the provider's login access permits the provider to modify the provider's account record;
modifying listing of the account record upon receiving a request from said provider; and
generating a result list comprised of listings wherein the criteria for each listing generates a match with the criteria data included match request, the listings in the result list arranged in an order corresponding in whole or in part to the bid amounts of the listings.

35. The method of claim 34, wherein the result list further includes at least one listing having no bid or a bid amount of zero.

36. The method of claim 35, wherein said listings include one or more search result listings.

37. The method of claim 34, wherein the result list further includes at least one listing that is not included in the account database.

38. The method of claim 34, wherein the step of modifying the listing of the account record upon receiving a request from the provider is performed in real time or substantially real time.

39. The method of claim 34, wherein the listing further includes a title and a description.

40. The method of claim 39, wherein the listing further includes at least one from the group of provider's contact information:
Uniform Resource Locator
E-mail address
Instant messaging address
Phone number
Pager number
FAX number
Physical address.

41. The method of claim 34, further comprising the step of, upon seeker selecting at least one of said listings in said results list for which seeker desires more information concerning, being presented with provider's information and/or information concerning provider's offering without being sent or directed to provider's web site.

42. The method of claim 34, further comprising the step of adding a listing in real or substantially real time to an account record of a provider upon receiving a request from said provider.

43. The method of claim 34, further comprising the step of deleting a listing in real or substantially real time from an account record of a provider upon receiving a request from said provider.

44. The method of claim 34, wherein the account record further comprises an account balance.

45. The method of claim 44, wherein the account balance is positive.

46. The method of claim 44, further comprising the step of adding in real or substantially real time a money amount to the account balance of the providers upon receiving a request from the providers.

47. The method of claim 46, wherein the money amount has been verified by an external financial authorization network.

48. The method of claim 34, wherein the criteria and the match request each comprise at least one character string.

49. The method of claim 34, further comprising the step of generating an activity report for a provider upon receiving a request from said provider.

50. The method of claim 34, further comprising the step of estimating a cost of a listing for a specified time period upon receiving a request from a provider.

51. The method of claim 50, wherein the estimated cost of a listing for the specified time period is calculated at least as a product of the current bid amount of the listing and a projected number of times the listing is expected to be selected by a at least one seeker in a specified time period.

52. The method of claim 34, wherein the bid amount of a provider's listing comprises a money amount that is deducted from the account balance of said provider's account each time the listing is selected by a remote seeker.

53. The method of claim 34, wherein the listings of the providers in the result list are sorted in decreasing order from highest to lowest bid amounts.

54. The method of claim 53, wherein an ordinal rank value is assigned in ascending order to each listing of the result list in the sorted order starting at the listing with the highest bid amount, which is assigned the smallest rank value, and ending with the listing with the lowest bid amount, which is assigned the largest rank value.

55. The method of claim 31, further comprising the step of displaying at least some portion of the result list.

56. The method of claim 34, further comprising the step of generating a match listing activity report.

57. The method of claim 34, further comprising the step of suggesting and/or generating alternative match criteria to said provider for at least one of provider's offerings with or without the request of said provider.

58. The method of claim 34, wherein said computer-compatible network is in whole or in part at least one from the group of:
the Internet
an intranet
an extranet
mobile/cell
landline
satellite.

59. A method of enabling a provider using at least one computer-compatible network to update information relating to a listing within a result list generated by a matching engine, said method comprising the steps of:
maintaining a database having at least one account record for at least one provider using the computer-compatible network(s), said account record including:
at least one listing, where each listing includes a criteria field having at least one criteria factor, a modifiable bid amount that is independent of the other components of the listing, a Uniform Resource Locator (URL) corresponding to the address of a document residing on a network server, a description, and a title;
an account balance;

payment processing information for the provider, said payment processing information maintained isolated from public access via the computer-compatible network(s);
payment histories of the provider; and
listing histories of the provider;
providing the provider with login access in response to authentication, wherein the provider's login access permits the provider access to modify the provider's account record, the provider not being provided with access to modify account records of others;
modifying the listing of a provider upon receiving a request from said provider;
receiving a match request, the match request including at least one criteria factor identified from at least one seekers criteria data set, the match request being received over a network from a seekers device; and
generating a result list in response to the match request, the result list including listings of the account records on a computer-compatible network, wherein the criteria for each listing in the result list generates a match with the match request, the listings in the result list arranged in an order determined using at least in part the bid amounts of the listings.

60. The method of claim 59, further comprising the step of adding a listing to an account of provider upon receiving a request from said provider.

61. The method of claim 59, further comprising the step of deleting a listing from the account record of a provider upon receiving a request from said provider.

62. The method of claim 59, further comprising the step of adding a money amount to the account balance of a provider upon receiving a request from said provider.

63. The method of claim 62, wherein the money amount has been verified by an external financial authorization network.

64. The method of claim 59, wherein the criteria comprises at least one character string.

65. The method of claim 59, further comprising the step of generating an account activity report for a provider upon receiving a request from said provider.

66. The method of claim 59, further comprising the step of estimating a cost of a listing for a specified time period upon receiving a request from a provider.

67. The method of claim 66, wherein the estimated cost is calculated as a product of the bid amount of the listing and a projected number of times the listing is selected in the specified time period.

68. The method of claim 59, wherein the bid amount of a provider's listing comprises a money amount that will be deducted from the account balance of said provider's account each time the listing is selected.

69. The method of claim 59, wherein the rank value is an ordinal value.

70. The method of claim 59, wherein the listings of the result list are sorted in decreasing order from highest to lowest bid amounts.

71. The method of claim 70, wherein a rank value is assigned to each listing of the result list in the sorted order starting at the listing with the highest bid amount, which is assigned the smallest rank value, and ending with the listing with the lowest bid amount, which is assigned the largest rank value.

72. The method of claim 71, further comprising the step of displaying at least some portion of the result list.

73. The method of claim 59, further comprising the step of generating a listing activity report.

74. The method of claim 59, further comprising the step of suggesting or generating alternative match criteria to said provider for at least one of provider's offerings.

75. The method of claim 59, further comprising the step of generating at least one additional criteria request after said result list has been generated.

76. The method of claim 75, wherein at least one of said listings is only displayed to said seeker upon the providing of at least one additional seeker criteria.

77. The method of claim 75, further comprising the step of generating one or more additional result lists upon the providing of at least one additional seeker criteria.

78. The method of claim 59, wherein, prior to or in conjunction with the initiation of said match request by said seeker, said criteria data set varies depending upon seekers prior criteria provided from at least one prior criteria data set.

79. The method of claim 59, wherein both said bid amounts and the appearance of said listings in said listing results are dependent upon the current and/or future satisfaction of one or more criteria for each of the listings.

80. The method of claim 7, wherein listings with no bid amounts or bid amounts of zero are included in said results lists in one of the following manners:
at the end of the paid listings, or
at the beginning of the paid listings, or
among the paid listings.

81. The method of claim 59, wherein said bid amounts are required to have a minimum monetary value of separation between themselves.

82. The method of claim 59, further comprising the step of arranging and displaying said listings of said results list in one or more categories and/or subcategories.

83. The method of claim 59, further comprising the step of storing at least some portion of seekers criteria data.

84. The method of claim 83, further comprising the step of subsequently generating at least one additional seeker result list based at least in part on seekers stored criteria data.

85. The method of claim 84, further comprising the step of selecting how often to generate said updated result list or lists for seeker.

86. Computer executable instructions stored on a tangible medium for collecting and analyzing data describing the bid options available for a PSB provider to determine if and/or when and/or where said PSB provider's advertisement(s) will appear, comprising a plurality of PSB bid modules, each capable of collecting bid data from PSB providers, determining the location and/or appearance frequency of said PSB provider's advertisement(s), and providing the information necessary to select the location and/or appearance frequency of said provider's advertisement(s); wherein the location of said provider's advertisement(s) is/are determined at least in part by at least one bid on one or more demographic and/or psychographic and/or firmographic.

87. A distributed information match mechanism comprising: means for storing a plurality of provider/advertiser registrations; means for receiving one or more entity demographics and/or psychographics and/or firmographics via a network; means for resolving said entity demographics and/or psychographics and/or firmographics against each of a plurality of provider/advertiser registrations to determine one or more matching provider/advertiser registrations each indicating a corresponding provider/advertiser information location; means for transmitting; at least in part monetarily determined as a result of one or more auctions of and/or bids on one or more demographic and/or psychographic and/or firmographic; match results to a device.

88. The distributed information match mechanism as recited in claim 87, further comprising: means for indexing and managing at least one of new, and/or existing, and/or exiting provider registrations from a plurality of provider/advertisers.

89. The distributed information match mechanism as recited in claim 87, wherein said entity demographics and/or psychographics and/or firmographics consists of at least one of the following: age, gender, income, marital status, occupation, familial size, familial composition, education, housing status, one or more health or medical conditions or diseases, one or more hobbies, employee count, industry type/category, revenue, number of locations/branches, sales volume, size, time length in business, profits, losses, market share, legal structure, student count, student composition, college degrees offered, population.

90. The distributed information match mechanism as recited in claim 87, wherein said entity demographics and/or psychographics and/or firmographics consists of at least five of the following: age, gender, income, marital status, occupation, familial size, familial composition, education, housing status, one or more health or medical conditions or diseases, one or more hobbies employee count, industry type/category, revenue, number of locations/branches, sales volume, size, time length in business, profits, losses, market share, legal structure, student count, student composition, college degrees offered, population.

91. The distributed information match mechanism of claim 87, further comprising: means for including five or more demographics and/or psychographics and/or firmographics.

92. A method comprising: maintaining a database including a plurality of product and/or service and/or benefit listings; wherein at least one product, service, benefit listing is associated with a bid and criteria; receiving a match or combination match/search request from a seeker/searcher; identifying the product and/or service and/or benefit listings having criteria generating a match with said match or combination match/search request; ordering any identified product, service, benefit listings into at least one match or combination match/search result list in accordance at least in part with the values of the respective bids for the identified product, service, benefit listings; receiving a retrieval request from said seeker/searcher to retrieve information associated with a product and/or service and/or benefit listings in the result list or lists.

93. The method of claim 92, wherein said values of the respective bid and/or payment amounts for the identified product, service, benefit listings are only one of two or more factors utilized in determining the order of said listings in said results list or lists.

94. The methods of claims 1, 12, 14, 21, 34, 59, or 92; wherein said criteria consists of one or more of the following: age, gender, income, marital status, occupation, familial size, familial composition, education, housing status, one or more health or medical conditions or diseases, one or more hobbies, employee count, industry type/category, revenue, number of locations/branches, sales volume, size, time length in business, profits, losses, market share, legal structure, student count, student composition, college degrees offered, population.

95. Computer executable instructions stored on a tangible medium comprising:
a database having at least one account record for each of a plurality of advertising providers using a computer-compatible network, the account record including:
at least one listing corresponding to at least one criteria, a bid amount, a locator corresponding to the address of a document residing on a network server, a description, and a title;
an account balance;
a history of listings included in the advertising provider's account record;
payment processing information, wherein said payment processing information is accessible to the computer-compatible network and isolated from public access via the computer-compatible network; and
a payment history;
programming code for providing the advertising provider with login access in response to authentication, wherein the advertising provider's login access grants the advertising provider access to modify the advertising provider's account, the advertising provider not being provided with access to modify the accounts of others;
programming code for adding money to the account of an advertising provider upon receiving a request from said advertising provider,
programming code for adding a listing to an account of an advertising provider upon receiving a request from said advertising provider;
programming code for deleting a listing to an account of an advertising provider upon receiving a request from said advertising provider;
programming code for modifying the listing of an advertising provider upon receiving a request from said advertising provider;
programming code for generating an activity report for an advertising provider upon receiving a request from said advertising provider,
programming code for receiving a match request from a remote device, the request including at least one criteria;
programming code for generating a result list in response to the match request, the result list including listings from the accounts on the database, wherein the criteria for each listing in the result list generates a match with the match request, the listings in the result list arranged in an order determined using at least in part the bid amounts of the listings.

96. The computer executable instructions stored on a tangible medium of claim 95, further comprising programming code for storing the match request criteria data.

97. The computer executable instructions stored on a tangible medium of claim 96, further comprising programming code for subsequently generating at least one additional result list based on at least some of the stored criteria data.

98. The computer executable instructions stored on a tangible medium of claim 97, further comprising programming code for selecting a frequency of generation of said additional result list.

99. The method of claim 1, wherein said values is only one of two or more factors utilized to determine the order of at least one of said PSB listings; other factors including but not limited to listing click-through rate, listing conversion rate, listing relevancy factor or factors.

100. The methods of claims 1, 12, 14, 21, 34, 59, or 92, wherein said criteria consists of at least five of the following: age, gender, income, marital status, occupation, familial size, familial composition, education, housing status, one or more health or medical conditions or diseases, one or more hobbies, employee count, industry type/category, revenue, number of locations/branches, sales volume, size, time length in business, profits, losses, market share, legal structure, student count, student composition, college degrees offered, population.

101. The methods of claims 1, 12, 14, 21, 34, 59, or 92, wherein said criteria comprises at least five criteria.

102. The method of claim 4, wherein said search result listings are presented anywhere in relation to said PSB result list; including one or more of before, after, amongst; above, below and/or to either side of said PSB result list.

103. The methods of claims 1, 12, 14, 21, 34, 59, or 92, wherein said steps are performed in any order.

104. A computer program product stored on a computer-readable medium including executable instructions that when executed by at least one processor performs functions comprising: maintaining a database having at least one account record for at least one provider using at least one network, said account record including: at least one listing, where each listing includes a criteria field having at least one criteria factor, a modifiable bid amount that is independent of the other components of the listing, a Uniform Resource Locator (URL) corresponding to the address of a document residing on a network server, a description, and a title; an account balance; payment processing information for the provider, said payment processing information maintained isolated from public access via at least one network; payment histories of the provider; and listing histories of the provider; providing the provider with login access in response to authentication, wherein the provider's login access permits the provider access to modify the provider's account record, the provider not being provided with access to modify account records of others; modifying the listing of a provider upon receiving a request from said provider; receiving a match request, the match request including at least one criteria factor obtained from at least one criteria source, the match request being received via at least one network from a seeker at/with a remote device and generating a result list in response to the match request, the result list including listings of the account records on at least one network, wherein the criteria for each listing in the result list generates a match with the match request, the listings in the result list arranged in an order determined using at least in part the bid amounts of the listings.

105. The computer program product of claim 104, wherein said criteria consists of at least one of the following: age, gender, income, marital status, occupation, familial size, familial composition, education, housing status, one or more health or medical conditions or diseases, one or more hobbies, employee count, industry type/category, revenue, number of locations/branches, sales volume, size, time length in business, profits, losses, market share, legal structure, student count, student composition, college degrees offered, population.

106. A tangible computer readable medium including a computer program, executable by a machine, for providing match results based on criteria, the computer program comprising executable instructions for: maintaining a database including a plurality of product, service, benefit listings; wherein each product, service, benefit listing is associated with a bid and criteria; receiving a match request from said seeker; identifying the product, service, benefit listings having criteria generating a match with said match request; ordering the identified product, service, benefit listings into a result list in accordance at least in part with the values of the respective bid amounts for the identified product, service, benefit listings; receiving a retrieval request from said seeker to retrieve information associated with a product, service, benefit listing in the result list; and recording a retrieval request event in database corresponding to said seeker's retrieval request.

107. A match engine comprising: at least one tangible match repository configured to perform matches; and a match component configured to: receive via an apparatus a match request including at least the demographics and/or psychographics and/or firmographics of a seeker, generate a plurality of matches, each of the plurality of matches being associated with at least one of a plurality of advertisers, receive at least one of at least in part monetarily determined match results from the at least one match repository for the match request, and transmitting said match results to at least one apparatus.

108. The match engine of claim 107, wherein the match component is further configured to: conduct the match process either before, during, or after a seeker search request.

109. The match engine of claim 107, wherein said demographics and/or psychographics and/or firmographics consists of one or more of the following: age, gender, income, marital status, occupation, familial size, familial composition, education, housing status, one or more health or medical conditions or diseases, one or more hobbies, employee count, industry type/category, revenue, number of locations/branches, sales volume, size, time length in business, profits, losses, market share, legal structure, student count, student composition, college degrees offered, population.

110. The match engine of claim 107, wherein at least one seeker demographic and/or psychographic and/or firmographic is entered into at least one query field.

111. The match engine of claim 110, wherein said query field is able to accept demographics and/or psychographics and/or firmographics as well as search terms/keywords.

112. A web page or web site comprising a plurality of data fields for entering and/or selecting a plurality of biddable search term keywords and a plurality of indicator mechanisms for indicating which of a plurality of demographics and/or psychographics and/or firmographics to utilize in increasing and/or decreasing the amount to be paid for said keyword or keywords.

113. A method of presenting an advertisement, the method comprising: associating one or more multigraphic and/or firmographic attributes with an advertisement; receiving input from a user, wherein the received input comprises one or more multigraphic and/or firmographic attributes; identifying at least a partial match between the multigraphic and/or firmographic attribute or attributes associated with the advertisement and the received input; and presenting the advertisement to the user; wherein the determination of the presentation order and/or size of and/or dimensions of and/or location of the advertisement is based at least in part on a bid on at least one of the said multigraphic and/or firmographic attributes.

114. The method of claim 113, wherein the received input includes a search request.

115. The method of claim 114, wherein presenting further comprises including the advertisement in search results generated in response to the search request.

116. The method of claim 113, further comprising increasing or decreasing the bid by some percentage of the bid.

117. The method of claim 113, further comprising increasing or decreasing the bid by a monetary amount.

118. The method of claim 113, further comprising associating at least one negative/contradictory multigraphic and/or firmographic attribute with the advertisement.

119. The method of claim 118, further comprising: identifying a match between the one or more negative/contradicting multigraphic and/or firmographic attributes and the received input; and determining not to present the advertisement to the user based on the identified match between the negative/contradicting multigraphic and/or firmographic attributes or attributes.

120. The method of claim 113, wherein the received input includes a search refinement.

121. The method of claim 120, further comprising receiving a bid for presenting the advertisement in response to the search refinement, wherein the bid increases or decreases the amount of a related bid.

122. The method of claim 121, further comprising increasing or decreasing the bid and/or related bid by some percentage of the bid and/or related bid.

123. The method of claim 121, further comprising increasing or decreasing the bid and/or related bid by a monetary amount.

124. The method of claim 113, wherein at least one of said attributes is selected from at least one set of predetermined attributes.

125. The method of claim 113, wherein said attributes consist of at least one attribute from the group of: age, gender, income, marital status, occupation, familial size, familial composition, education, housing status, one or more health or medical conditions or diseases, one or more hobbies, employee count, industry type/category, revenue, number of locations/branches, sales volume, size, time length in business, profits, losses, market share, legal structure, student count, student composition, college degrees offered, population.

126. A system for presenting an advertisement, the system comprising processor electronics configured to perform operations comprising: associating one or more multigraphic and/or firmographic attributes with an advertisement for which at least one bid has been received; receiving input from a user via a device, wherein the received input comprises one or more multigraphic and/or firmographic attributes; identifying a match between the multigraphic and/or firmographic attribute or attributes associated with the advertisement and the received input; and presenting the advertisement to the user.

127. The system of claim 126, wherein the processor electronics are further configured to present the advertisement to the user in conjunction with search results and/or additional content.

128. The system of claim 126, wherein the processor electronics are further configured to determine a presentation order and/or size and/or location of the advertisement based at least in part on at least one factor comprising the bid, a click-through rate of the advertisement, and an estimated or actual conversion rate of the advertisement.

129. The system of claim 126, wherein the processor electronics are further configured to: associate one or more negative/contradictory multigraphic and/or firmographic attributes with the advertisement; identify a match between the one or more negative/contradictory multigraphic and/or firmographic attributes and the received input; and determine not to present the advertisement to the user based on the identified match between the negative/contradictory multigraphic and/or firmographic attribute or attributes.

130. The system of claim 126, wherein the processor electronics are further configured to receive input from the user through a graphical user interface.

131. The system of claim 126, wherein said attributes consist of at least one attribute from the group of: age, gender, income, marital status, occupation, familial size, familial composition, education, housing status, one or more health or medical conditions or diseases, one or more hobbies, employee count, industry type/category, revenue, number of locations/branches, sales volume, size, time length in business, profits, losses, market share, legal structure, student count, student composition, college degrees offered, population.

132. The system of claim 126, wherein the processor electronics are further configured to increase or decrease the bid by some percentage of the bid.

133. The system of claim 126, wherein the processor electronics are further configured to increase or decrease the bid by a monetary amount.

134. The system of claim 126, wherein the processor electronics are further configured to associate one or more multigraphic and/or firmographic attributes by selecting said attributes from a set comprising a plurality of predetermined multigraphic and/or firmogrphic attributes.

135. An article of manufacture comprising machine-readable instructions for presenting an advertisement, the machine-readable instructions being operable to perform operations comprising: associating one or more multigraphic and/or firmographic attributes with an advertisement for which at least one bid has been received; receiving input from a user, wherein the received input comprises one or more multigraphic and/or firmographic attributes; identifying a match between the multigraphic and/or firmographic attribute or attributes associated with the advertisement and the received input; and presenting the advertisement to the user.

136. The article of manufacture comprising machine-readable instructions of claim 135, wherein the received input comprises a search request.

137. The article of manufacture comprising machine-readable instructions of claim 136, wherein the machine-readable instructions for presenting are further operable to perform operations comprising including the advertisement in search results generated in response to the search request.

138. The article of manufacture comprising machine-readable instructions of claim 135, wherein the machine-readable instructions are further operable to perform operations comprising associating at least one negative/contradicting multigraphic and/or firmographic attribute with the advertisement.

139. The article of manufacture comprising machine-readable instructions of claim 138, wherein the machine-readable instructions are further operable to perform operations comprising: identifying a match between the one or more negative/contradicting multigraphic and/or firmographic attributes and the received input; and determining not to present the advertisement to the user based on the identified match between the negative/contradicting multigraphic and/or firmographic attribute or attributes.

140. The article of manufacture comprising machine-readable instructions of claim 135, wherein the received input comprises a search refinement.

141. The article of manufacture comprising machine-readable instructions of claim 140, wherein the machine-readable instructions for presenting are further operable to perform operations comprising modifying a presentation order corresponding to a previous keyword match based on the search refinement.

142. The article of manufacture comprising machine-readable instructions of claim 140, wherein the machine-readable instructions are further operable to perform operations comprising receiving a bid for presenting the advertisement in response to the search refinement, wherein the bid increases or decreases the amount of a related bid.

143. The article of manufacture comprising machine-readable instructions of claim 135, wherein said attributes consist of at least one attribute from the group of: age, gender, income, marital status, occupation, familial size, familial composition, education, housing status, one or more health or medical conditions or diseases, one or more hobbies, employee count, industry type/category, revenue, number of locations/branches, sales volume, size, time length in business, profits, losses, market share, legal structure, student count, student composition, college degrees offered, population.

144. The article of manufacture comprising machine-readable instructions of claim 137, wherein the machine-readable instructions are further operable to perform operations comprising receiving a bid for presenting the advertisement in response to input from a user that includes the associated one or more multigraphic and/or firmographic attributes.

145. The article of manufacture comprising machine-readable instructions of claim 144, wherein the machine-readable instructions are further operable to perform operations comprising increasing or decreasing said bid by some percentage of the bid.

146. The article of manufacture comprising machine-readable instructions of claim 144, wherein the machine-readable instructions are further operable to perform operations comprising increasing or decreasing the bid by a monetary amount.

147. The article of manufacture comprising machine-readable instructions of claim 144, wherein the machine-readable instructions are further operable to perform operations comprising determining the presentation order and/or size and/or location of the advertisement based at least in part on at least one factor comprising the bid, a click-through rate of the advertisement, and an estimated or actual conversion rate of the advertisement.

148. The article of manufacture comprising machine-readable instructions of claim 142, wherein the machine-readable instructions are further operable to perform operations comprising increasing or decreasing the bid and/or related bid by some percentage of the bid and/or related bid.

149. The article of manufacture comprising machine-readable instructions of claim 142, wherein the machine-readable instructions are further operable to perform operations comprising increasing or decreasing the bid and/or related bid by a monetary amount.

150. The article of manufacture comprising machine-readable instructions of claim 135, wherein the machine-readable instructions are further operable to perform operations comprising associating one or more multigraphic and/or firmographic attributes by selecting said attributes from a set comprising a plurality of predetermined multigraphic and/or firmographic attributes.

151. A method of presenting an advertisement, the method comprising: receiving input from a user via a physical device, wherein the received input comprises one or more psychographic and/or firmographic attributes; identifying one or more relevant advertisements based on a match between the received input and one or more psychographic and/or firmographic attributes having predetermined associations with a plurality of advertisements; and delivering at least one relevant advertisement to a physical device.

152. The method of claim 151, further comprising wherein said input from a user also includes one or more search terms/keywords.

153. The method of claim 152, wherein; in response to the received input; presenting further comprises presenting search results either prior to, concurrently with, or subsequent to presenting one or more advertisements having a matched association with both user and at least one of said advertisements.

154. The method of claim 151, further comprising: determining a presentation order and/or web page and/or web site location of at least one relevant advertisement based at least in part on at least one corresponding bid.

155. The method of claim 154, wherein at least one corresponding bid is increased or decreased by some percentage.

156. The method of claim 155, wherein some percentage is some percentage of the corresponding bid.

157. The method of claim 154, wherein the corresponding bid is increased or decreased by a monetary amount.

158. The method of claim 152, further comprising: determining a presentation order and/or web page and/or web site location of at least one relevant advertisement based at least in part on at least one corresponding bid.

159. The method of claim 158, wherein at least one corresponding bid is increased or decreased by some percentage.

160. The method of claim 159, wherein some percentage is some percentage of the corresponding bid.

161. The method of claim 158, wherein the corresponding bid is increased or decreased by a monetary amount.

162. The method of claim 154, further comprising: determining a presentation order and/or web page and/or web site location of at least one advertisement based on one or more of the bid, a click-through rate of the advertisement, and a conversion rate of the advertisement.

163. The method of claim 158, further comprising: determining a presentation order and/or web page and/or web site location of at least one advertisement based on one or more of the bid, a click-through rate of the advertisement, and a conversion rate of the advertisement.

164. The method of claim 151, wherein said psychographic and/or firmographic attributes are drawn from a set compromising a plurality of predetermined psychographic and/or firmographic attributes.

165. The method of claim 152, wherein said psychographic and/or firmographic attributes are drawn from a set compromising a plurality of predetermined psychographic and/or firmographic attributes.

166. The method of claim 151, further comprising: receiving at least one search term/keyword prior to receiving input from the user; and presenting search results and corresponding psychographic and/or firmographic attributes in response to the received at least one search term/keyword.

167. The method of claim 166, wherein the corresponding multigraphic and/or firmographic attributes are associated with a predetermined context.

168. A method of enabling an advertiser to select a monetary amount to pay for an advertisement, the method comprising: enable the selecting of one or more search term keywords for an advertisement, receive an indication of an initial monetary bid amount advertiser is willing to pay for said one or more keywords; thereafter enable the increasing or decreasing of said initial bid by an additional monetary amount through enabling the advertisers ability to select one or more multigraphic and/or firmographic attributes applicable and/or not applicable to advertisers targets.

169. The method of claim 168, wherein said advertisement is a pay per click advertisement and/or a pay per impression advertisement.

170. The method of claim 168, wherein said additional monetary amount is a percentage of advertisers initial bid amount.

171. The method of claim 170, wherein said percentage is drawn from a set comprising a plurality of predetermined percentages.

172. The method of claim 170, wherein said percentages are in either five or ten percent increments.

173. The method of claim 168, wherein at least one of said attributes is obtained from at least one third party and/or from at least one seeker; said third party defined as being any entity other than the advertising method provider or seeker.

174. The method of claim 168, wherein at least one of said attributes is obtained from at least one social network and/or at least one search engine and/or at least one blog.

175. The method of claim 168, wherein at least one of said attributes is obtained via the use of at least part of at least one: profile, questionnaire, subscription form; machine, instrumentality, tool, system, or process utilized to gather said attributes.

176. The method of claim 168, wherein at least one of said attributes is saved.

177. The method of claim 168, wherein at least one of said attributes is obtained from at least one query box.

178. The method of claim 168, further comprising: receive at least one of said attributes as a result of the use of at least one drop down box.

179. The method of claim 168, wherein said attributes consist of at least one attribute from the group of: age, gender, income, marital status, occupation, familial size, familial composition, education, housing status, one or more health or medical conditions or diseases, one or more hobbies, employee count, industry type/category, revenue, number of locations/branches, sales volume, size, time length in business, profits, losses, market share, legal structure, student count, student composition, college degrees offered, population.

180. The method of claim 168, wherein one or more of said multigraphic and/or firmographic attributes are obtained from one or more from the group comprising: MySpace, Facebook, Microsofts Hotmail, YouTube, Yahoo Mail, Friendster, Windows Live, LinkedIn, PlentyOfFish, America Online (AOL) registered user/members, eBay, Amazon, Skype, Twitter, Orkut, Classmates.com, Hi5, Flixster, Bebo, Geni, Tagged, Skyrock, Sonico, Reunion.com, Xiaonei, V Kontakte, any entity utilizing profiles, any entity utilizing subscriptions, any entity which gathers multigraphic and/or firmographic attribute data.

181. A method of enabling an advertiser to prevent an advertisement from being presented to one or more particular multigraphic and/or firmographic groups, the method compromising: enable the selecting of one or more search term keywords for an advertisement, receive an indication of a bid amount advertiser is willing to pay for said one or more keywords, enable the selecting of one or more unwanted multigraphic and/or firmographic attributes applicable to one or more of said groups; correlating advertisers unwanted attributes with one or more groups having said unwanted attributes; thereafter not presenting said advertisement to said group or groups.

182. A system for enabling an advertiser to select a monetary amount to pay for an advertisement, the system comprising processor electronics configured to perform operations comprising: enable the selecting of one or more search term keywords for an advertisement, receive an indication of an initial monetary bid amount advertiser is willing to pay for said keywords; thereafter enable the increasing or decreasing of said initial bid by an additional monetary amount through enabling the advertisers ability to select one or more multigraphic and/or firmographic attributes applicable and/or not applicable to advertisers targeted seekers.

183. The system of claim 182, wherein the processor electronics are further configured to provide for said advertisement to be a pay per click advertisement and/or a pay per impression advertisement.

184. The system of claim 182, wherein the processor electronics are further configured to provide for said additional amount to be a percentage of advertisers initial monetary bid amount.

185. The system of claim 184, wherein the processor electronics are further configured to draw said percentage from a set comprising a plurality of predetermined percentages.

186. The system of claim 184, wherein the processor electronics are further configured for said percentages to be in either five or ten percent increments.

187. The system of claim 182, wherein the processor electronics are further configured to obtain at least one of said attributes from at least one third party and/or from at least one seeker; said third party defined as being any entity other than the advertising system provider or seeker.

188. The system of claim 182, wherein the processor electronics are further configured to obtain at least one of said attributes from at least one social network and/or one search engine and/or one blog.

189. The system of claim 182, wherein the processor electronics are further configured to obtain at least one of said attributes via the use of at least part of at least one: profile, questionnaire, subscription form; machine, instrumentality, tool, system, or process able to provide said attributes.

190. The system of claim 182, wherein the processor electronics are further configured to save at least one of said attributes.

191. The system of claim 182, wherein the processor electronics are further configured to obtain at least one of said attributes from at least one query box.

192. The system of claim 182, wherein the processor electronics are further configured to receive at least one of said attributes from at least one drop down box.

193. A system for enabling an advertiser to prevent an advertisement from being presented to one or more particular multigraphic and/or firmographic groups, the system comprising processor electronics configured to perform operations comprising: enable the selecting of one or more search term keywords for an advertisement, receive an indication of a monetary bid amount advertiser is willing to pay for said keywords, enable the selecting of one or more unwanted multigraphic and/or firmographic attributes applicable to one or more of said groups; correlating advertisers unwanted attributes with one or more groups having said unwanted attributes; thereafter not presenting said advertisement to said group or groups.

194. The system of claim 182, wherein the processor electronics are further configured to obtain one or more of said multigraphic and/or firmographic attributes from one or more from the group comprising: MySpace, Facebook, Hotmail, YouTube, Yahoo Mail, Friendster, Windows Live, LinkedIn, PlentyOfFish, America Online (AOL) registered user/members, eBay, Amazon, Skype, Twitter, Orkut, Classmates.com, Hi5, Flixster, Bebo, Geni, Tagged, Skyrock, Sonico, Reunion.com, Xiaonei, V Kontakte, any entity utilizing profiles, any entity utilizing subscriptions, any entity which gathers multigraphic and/or firmographic attribute data.

195. The systems of claim 182 or 193, wherein said attributes consist of at least one attribute from the group of: age, gender, income, marital status, occupation, familial size, familial composition, education, housing status, one or more health or medical conditions or diseases, one or more hobbies, employee count, industry type/category, revenue, number of locations/branches, sales volume, size, time length in business, profits, losses, market share, legal structure, student count, student composition, college degrees offered, population.

196. An article of manufacture comprising machine-readable instructions for enabling an advertiser to select a monetary amount to pay for an advertisement, the machine-readable instructions being operable to perform operations comprising: enabling the selecting of one or more search term keywords for an advertisement, receiving an indication of an initial monetary bid amount advertiser is willing to pay for said keywords; thereafter enabling the increasing or decreasing of said initial bid by an additional monetary amount through enabling the advertisers ability to select one or more multigraphic and/or firmographic attributes applicable and/or not applicable to advertisers targets.

197. The article of manufacture comprising machine-readable instructions of claim 196, wherein said advertisement is a pay per click advertisement and/or a pay per impression advertisement.

198. The article of manufacture comprising machine-readable instructions of claim 196, wherein said additional monetary amount is a percentage of advertisers initial bid amount.

199. The article of manufacture comprising machine-readable instructions of claim 198, wherein said percentage is drawn from a set comprising a plurality of predetermined percentages.

200. The article of manufacture comprising machine-readable instructions of claim 198, wherein said percentages are in five or ten percent increments.

201. The article of manufacture comprising machine-readable instructions of claim 196, wherein at least one of said attributes is obtained from at least one third party and/or from at least one seeker, said third party defined as being any entity other than the advertising system/method provider or seeker.

202. The article of manufacture comprising machine-readable instructions of claim 196, wherein at least one of said attributes is obtained from at least one social network and/or one search engine and/or one blog.

203. The article of manufacture comprising machine-readable instructions of claim 196, wherein at least one of said attributes is obtained via the use of at least part of at least one: profile, questionnaire, subscription form; machine, instrumentality, tool, system, or process utilized to obtain said attributes.

204. The article of manufacture comprising machine-readable instructions of claim 196, wherein at least one of said attributes is saved.

205. The article of manufacture comprising machine-readable instructions of claim 196, wherein at least one of said attributes is obtained from at least one, query box.

206. The article of manufacture comprising machine-readable instructions of claim 196, wherein the machine-readable instructions are further operable to perform operations comprising receiving at least one of said attributes as a result of the use of at least one drop down box.

207. The article of manufacture comprising machine-readable instructions of claim 196, wherein said attributes consist of at least one attribute from the group of: age, gender, income, marital status, occupation, familial size, familial composition, education, housing status, one or more health or medical conditions or diseases, one or more hobbies, employee count, industry type/category, revenue, number of locations/branches, sales volume, size, time length in business, profits, losses, market share, legal structure, student count, student composition, college degrees offered, population.

208. The article of manufacture comprising machine-readable instructions of claim 196, wherein one or more of said multigraphic and/or firmographic attributes are obtained from one or more from the group comprising: MySpace, Facebook, Hotmail, YouTube, Yahoo Mail, Friendster, Windows Live, LinkedIn, PlentyOfFish, America Online (AOL) registered user/members, eBay, Amazon, Skype, Twitter, Orkut, Classmates.com, Hi5, Flixster, Bebo, Geni, Tagged, Skyrock, Sonico, Reunion.com, Xiaonei, V Kontakte, any entity utilizing profiles, any entity utilizing subscriptions, any entity which gathers multigraphic and/or firmographic attribute data.

209. An article of manufacture comprising machine-readable instructions for enabling an advertiser to prevent an advertisement from being presented to one or more particular multigraphic and/or firmographic groups, the machine-readable instructions being operable to perform operations comprising: enabling the selecting of one or more search term keywords for an advertisement, receiving an indication of a bid amount advertiser is willing to pay for said one or more keywords, enabling the selecting of one or more unwanted multigraphic and/or firmographic attributes applicable to one or more of said groups; correlating advertisers unwanted attributes with one or more groups having said unwanted attributes; thereafter not presenting said advertisement to said groups.

210. A system comprising the auctioning of and/or bidding on of entity demographics and/or psychographics and/or firmographics.

211. The system of claim 210; wherein said demographics and/or psychographics and/or firmographics consists of one or more of the following: age, gender, income, marital status, occupation, familial size, familial composition, education, housing status, one or more health or medical conditions or diseases, one or more hobbies, employee count, industry type/category, revenue, number of locations/branches, sales volume, size, time length in business, profits, losses, market share, legal structure, student count, student composition, college degrees offered, population.

212. The system of claim 210, wherein at least one of said demographics and/or psychographics and/or firmographics is selected by using; or is received from; at least one drop-down box.

213. The system of claim 212, further comprising five or more drop-down boxes.

214. The system of claim 210, wherein at least one of said demographics and/or psychographics and/or firmographics is expressed as a numeric range.

215. A method comprising the auctioning of and/or bidding on of entity demographics and/or psychographics and/or firmographics; wherein said auctioning and/or bidding is conducted at least in part utilizing at least one computing device.

216. The method of claim 215, wherein said demographics and/or psychographics and/or firmographics consists of one or more of the following: age, gender, income, marital status, occupation, familial size, familial composition, education, housing status, one or more health or medical conditions or diseases, one or more hobbies, employee count, industry type/category, revenue, number of locations/branches, sales volume, size, time length in business, profits, losses, market share, legal structure, student count, student composition, college degrees offered, population.

217. The method of claim 215, wherein at least one of said demographics and/or psychographics and/or firmographics is selected by using; or is received from; at least one drop-down box.

218. The method of claim 217, further comprising five or more drop-down boxes.

219. The method of claim 215, wherein at least one of said demographics and/or psychographics and/or firmographics is expressed as a numeric range.

220. A computer program product stored on a computer-readable medium including executable instructions that when executed by at least one processor performs functions comprising: auctioning and/or bidding on entity demographics and/or psychographics and/or firmographics.

221. The computer program product of claim 220, wherein said demographics and/or psychographics and/or firmographics consists of one or more of the following: age, gender, income, marital status, occupation, familial size, familial composition, education, housing status, one or more health or medical conditions or diseases, one or more hobbies, employee count, industry type/category, revenue, number of locations/branches, sales volume, size, time length in business, profits, losses, market share, legal structure, student count, student composition, college degrees offered, population.

222. The computer program product of claim 220, wherein at least one of said demographics and/or psychographics and/or firmographics is selected by using; or is received from; at least one drop-down box.

223. The computer program product of claim 222, further comprising five or more drop-down boxes.

224. The computer program product of claim 220, wherein at least one of said demographics and/or psychographics and/or firmographics is expressed as a numeric range.

225. An article of manufacture comprising machine-readable instructions, the machine-readable instructions being operable to perform operations comprising: the auctioning of and/or bidding on of entity demographics and/or psychographics and/or firmographics.

226. The article of manufacture of claim 225, wherein said demographics and/or psychographics and/or firmographics consists of one or more of the following: age, gender, income, marital status, occupation, familial size, familial composition, education, housing status, one or more health or medical conditions or diseases, one or more hobbies, employee count, industry type/category, revenue, number of locations/branches, sales volume, size, time length in business, profits, losses, market share, legal structure, student count, student composition, college degrees offered, population.

227. The article of manufacture of claim 225, wherein at least one of said demographics and/or psychographics and/or firmographics is selected by using; or is received from; at least one drop-down box.

228. The article of manufacture of claim 227, further comprising five or more drop-down boxes.

229. The article of manufacture of claim 225, wherein at least one of said demographics and/or psychographics and/or firmographics is expressed as a numeric range.

* * * * *